(12) United States Patent
Aikyo

(10) Patent No.: US 12,286,185 B2
(45) Date of Patent: Apr. 29, 2025

(54) SADDLED VEHICLE, VEHICLE, AND RIDER PROTECTOR

(71) Applicant: HONDA MOTOR CO., LTD., Tokyo (JP)

(72) Inventor: Yutaka Aikyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/580,195

(22) PCT Filed: Jul. 27, 2021

(86) PCT No.: PCT/JP2021/027784
§ 371 (c)(1),
(2) Date: Jan. 18, 2024

(87) PCT Pub. No.: WO2023/007590
PCT Pub. Date: Feb. 2, 2023

(65) Prior Publication Data
US 2025/0002108 A1    Jan. 2, 2025

(51) Int. Cl.
*B62J 27/20* (2020.01)
*A41D 13/05* (2006.01)
*B62J 1/00* (2006.01)

(52) U.S. Cl.
CPC .......... *B62J 27/20* (2020.02); *A41D 13/0518* (2013.01); *B62J 1/00* (2013.01)

(58) Field of Classification Search
CPC ................................ B62J 27/02; A41D 13/018
See application file for complete search history.

(56) References Cited

U.S. PATENT DOCUMENTS

| | | | |
|---|---|---|---|
| 5,781,936 A * | 7/1998 | Alaloof | A41D 13/018 2/456 |
| 5,938,231 A * | 8/1999 | Yamazaki | B62J 27/20 280/728.1 |
| 6,230,333 B1 * | 5/2001 | Umeda | A41D 13/018 2/463 |

(Continued)

FOREIGN PATENT DOCUMENTS

| CN | 202896507 U | 4/2013 |
|---|---|---|
| DE | 10247120 A1 | 6/2004 |

(Continued)

OTHER PUBLICATIONS

Goto et al., Moving Body, Feb. 10, 2011, EPO, JP 2011-025888 A, Machine Translation of Description (Year: 2011).*

(Continued)

*Primary Examiner* — James A English
(74) *Attorney, Agent, or Firm* — Rankin, Hill & Clark LLP

(57) ABSTRACT

In a saddled vehicle, a vehicle, and a rider protector, an airbag is made compact, and the airbag is prevented from being obstructed by arms of a rider, so that the airbag properly protects the rider. A saddled vehicle includes a seat for a rider and an airbag provided in front of the seat. The airbag includes a first deploying portion that is deployed upward when deployed, a second deploying portion that branches and extends from the first deploying portion when deployed; and the second deploying portion extends outward in a vehicle width direction from the first deploying portion.

20 Claims, 21 Drawing Sheets

(56) References Cited

U.S. PATENT DOCUMENTS

| | | | |
|---|---|---|---|
| 7,484,751 B2* | 2/2009 | Goto | B62J 27/20 |
| | | | 2/463 |
| 10,046,726 B2* | 8/2018 | Richard | B60R 21/0132 |
| 12,128,978 B2* | 10/2024 | Aikyo | B62J 27/20 |
| 2003/0214121 A1 | 11/2003 | Miyata et al. | |

FOREIGN PATENT DOCUMENTS

| | | | | |
|---|---|---|---|---|
| GB | 1462125 A | | 1/1977 | |
| GB | 1588919 A | * | 4/1981 | ........... A41D 13/018 |
| JP | H10-006901 A | | 1/1998 | |
| JP | 2003-327184 A | | 11/2003 | |
| JP | 2008-121159 A | | 5/2008 | |
| JP | 2011025888 A | * | 2/2011 | |
| JP | 2011-184015 A | | 9/2011 | |
| JP | 2019-206789 A | | 12/2019 | |
| SE | 1950616 A1 | | 12/2019 | |

OTHER PUBLICATIONS

International Search Report Corresponding to International Application No. PCT/JP2021/027784, dated Oct. 12, 2021, 3 pages.

International Preliminary Report on Patentability Corresponding to International Application No. PCT/JP2021/027784, dated Jul. 19, 2022, 11 pages.

Written Opinion of the International Preliminary Examining Authority Corresponding to International Application No. PCT/JP2021/027784, dated Mar. 22, 2022, 8 pages.

International Preliminary Report on Patentability, International Application No. PCT/JP2021/027784, Date of mailing: Feb. 1, 2024, 4 pages.

Japanese Office Action dated Jul. 16, 2024, Application No. 2023-537793; English machine translation included, 7 pages.

* cited by examiner

SADDLED VEHICLE, VEHICLE, AND RIDER PROTECTOR

TECHNICAL FIELD

The present invention relates to a saddled vehicle, a vehicle, and a rider protector.

BACKGROUND ART

Conventionally, a saddled vehicle has been known that includes an airbag in front of a seat for a rider in which the airbag includes a portion that is deployed upward in front of the rider and portions that extend toward the rear side of the rider through the lateral sides of the rider (for example, see Patent Literature 1). In Patent Literature 1, surrounding the rider from the front side and both the left and right sides with the airbag causes the airbag to be in close contact with the rider to effectively protect the rider.

CITATION LIST

Patent Literature

[Patent Literature 1]
Japanese Patent Laid-Open No. 10-6901

SUMMARY OF INVENTION

Technical Problem

However, the conventional airbag described above has a large portion extending toward the rear side of the rider, resulting in a large volume of the airbag. This increases the amount of gas required to deploy the airbag, and when the deployed airbag covers, for example, the arms of the rider from the outsides, the arms may obstruct the airbag to hinder the airbag from deploying. Therefore, it is desirable to make the airbag compact and to prevent the airbag from being obstructed by the arms of the rider so that the airbag protects the rider.

The present invention has been made in view of the above-mentioned circumstances, and it is an object of the present invention to make an airbag compact in a saddled vehicle, a vehicle, and a rider protector, and to prevent the airbag from being obstructed by arms of a rider to properly protect the rider with the airbag.

Solution to Problem

A saddled vehicle includes: a seat for a rider; and an airbag provided in front of the seat or in a front part of the seat, in which the airbag includes a first deploying portion that is deployed upward when deployed, an upwardly deploying portion that is deployed upward from the first deploying portion when deployed, and a second deploying portion that branches and extends from the first deploying portion when deployed, and the second deploying portion extends outward in a vehicle width direction, rearward, or rearward and outward in the vehicle width direction, from the first deploying portion.

Furthermore, a vehicle includes an airbag provided in front of a riding position for a rider, in which the vehicle is a stand-up vehicle on which a rider stands at the riding position, the airbag includes a first deploying portion that is deployed upward when deployed, an upwardly deploying portion that is deployed upward from the first deploying portion when deployed, and a second deploying portion that branches and extends from the first deploying portion when deployed, and the second deploying portion extends outward in a vehicle width direction, rearward, or rearward and outward in the vehicle width direction, from the first deploying portion.

Furthermore, a rider protector includes rider equipment, worn by a rider riding on a vehicle, and an airbag, in which the airbag is supported by the rider equipment and is located on a front surface side of a torso of the rider, the airbag includes a first deploying portion that is deployed upward when deployed, an upwardly deploying portion that is deployed upward from the first deploying portion when deployed, and a second deploying portion that branches and extends from the first deploying portion when deployed, and the second deploying portion extends outward in a vehicle width direction, rearward, or rearward and outward in the vehicle width direction, from the first deploying portion.

Advantageous Effects of Invention

The airbag is allowed to be compact and allowed to be prevented from being obstructed by the arms of the rider, allowing the airbag to protect the rider.

DESCRIPTION OF EMBODIMENTS

Figure 1:
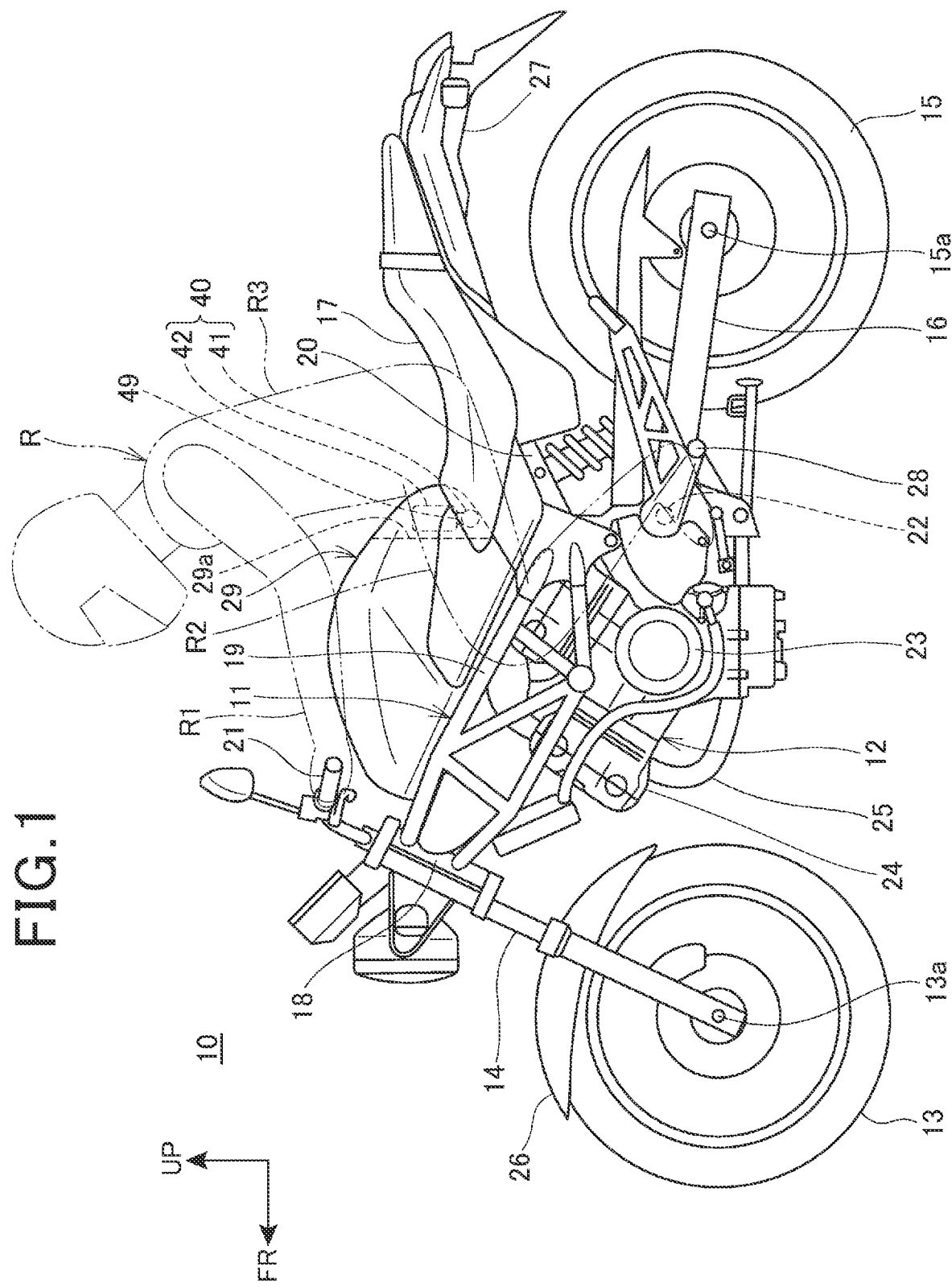
FIG. 1 is a side view of a saddled vehicle according to an embodiment of the present invention.

Embodiments of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddled vehicle 10 according to an embodiment of the present invention.

The saddled vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddled vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddled vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The fuel tank 29 is disposed in front of the seat 17 and behind the head pipe 18.

The rider R sitting on the seat 17 extends both arms R1 forward to grasp the handle 21, puts both feet on the footrests 28, and sandwiches the vehicle body such as the fuel tank 29 and the vehicle body frame 11 between the legs R2 to hold the vehicle body.

The saddled vehicle 10 includes an airbag device 40 that protects the rider R.

The airbag device 40 is disposed in front of the seat 17, and is provided so as to coincide with the rear end portion of the fuel tank 29 in position in the vehicle width direction in a vehicle side view.

The airbag device 40 is disposed in an airbag storage portion 29a provided at the rear end portion of the fuel tank 29. The airbag storage portion 29a is, for example, a recessed portion formed in such a way that the rear end portion of the fuel tank 29 is recessed, and the airbag device 40 is disposed in this recessed portion.

The airbag device 40 includes an inflator 41 and an airbag 42 that is inflated by gas released by the inflator 41. The airbag 42 is stored in the airbag storage portion 29a in a folded state. The airbag 42 is disposed in front of the seating position of the rider R on the seat 17, and is located in front of the rider. Furthermore, the airbag 42 is disposed at the center in the vehicle width direction, similarly to the front wheels 13.

The saddled vehicle 10 includes an acceleration sensor (not shown) that detects an impact acting on the saddled vehicle 10. This acceleration sensor is electrically connected to a control unit (not shown) of the saddled vehicle 10, and the control unit is electrically connected to the inflator 41. The control unit determines whether the airbag device 40 to be operated or not based on the detected acceleration. When operating the airbag device 40, the control unit operates the inflator 41 to release gas into the airbag 42. The airbag 42 is inflated and deployed by gas pressure.

The airbag 42 is covered by a cover (not shown) that covers the airbag storage portion 29a from above. When inflated, the airbag 42 pushes away the cover to be deployed.

Figure 2:
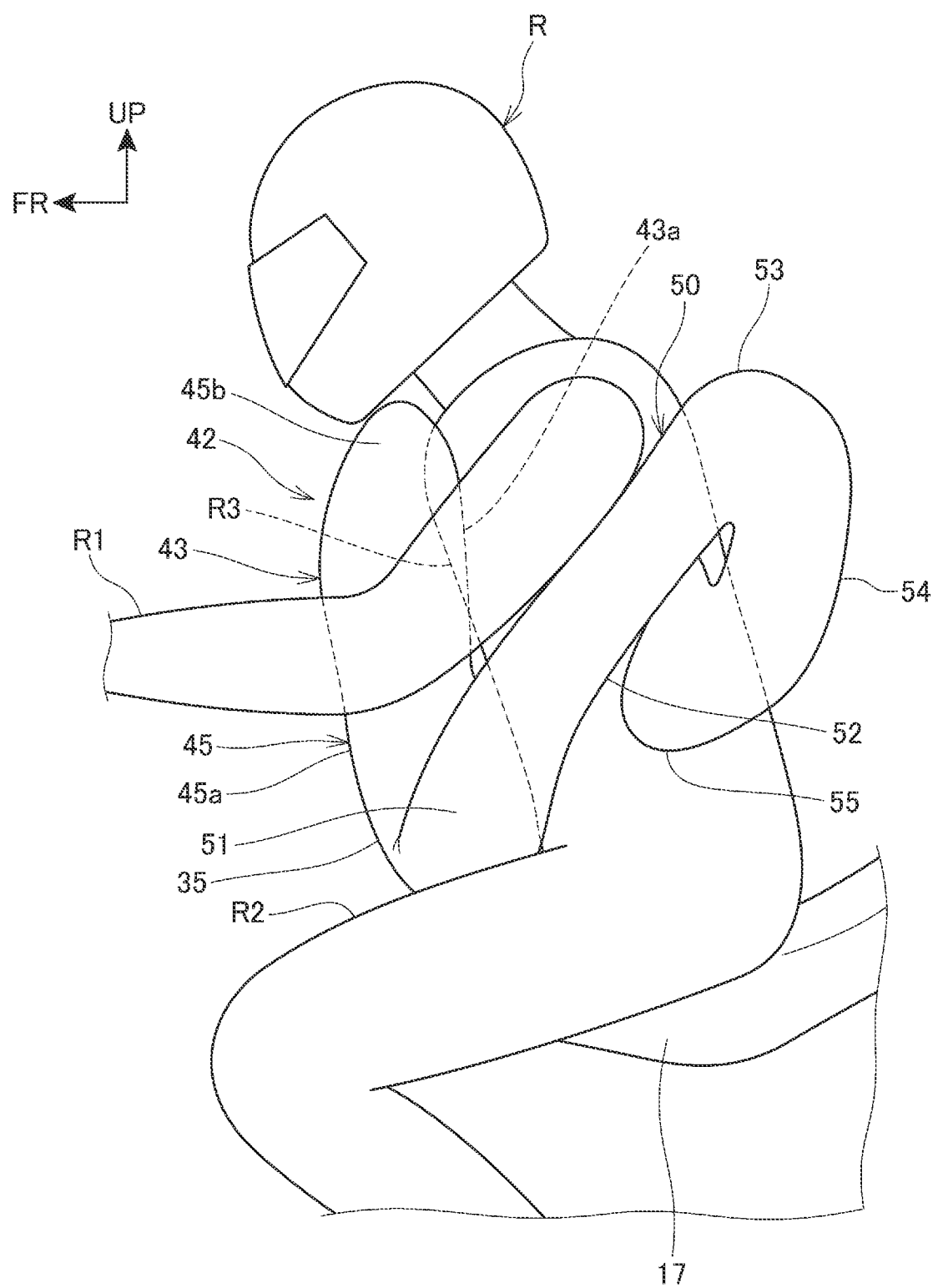
FIG. 2 is a left side view showing a state in which an airbag is deployed to protect a rider.
Figure 3:
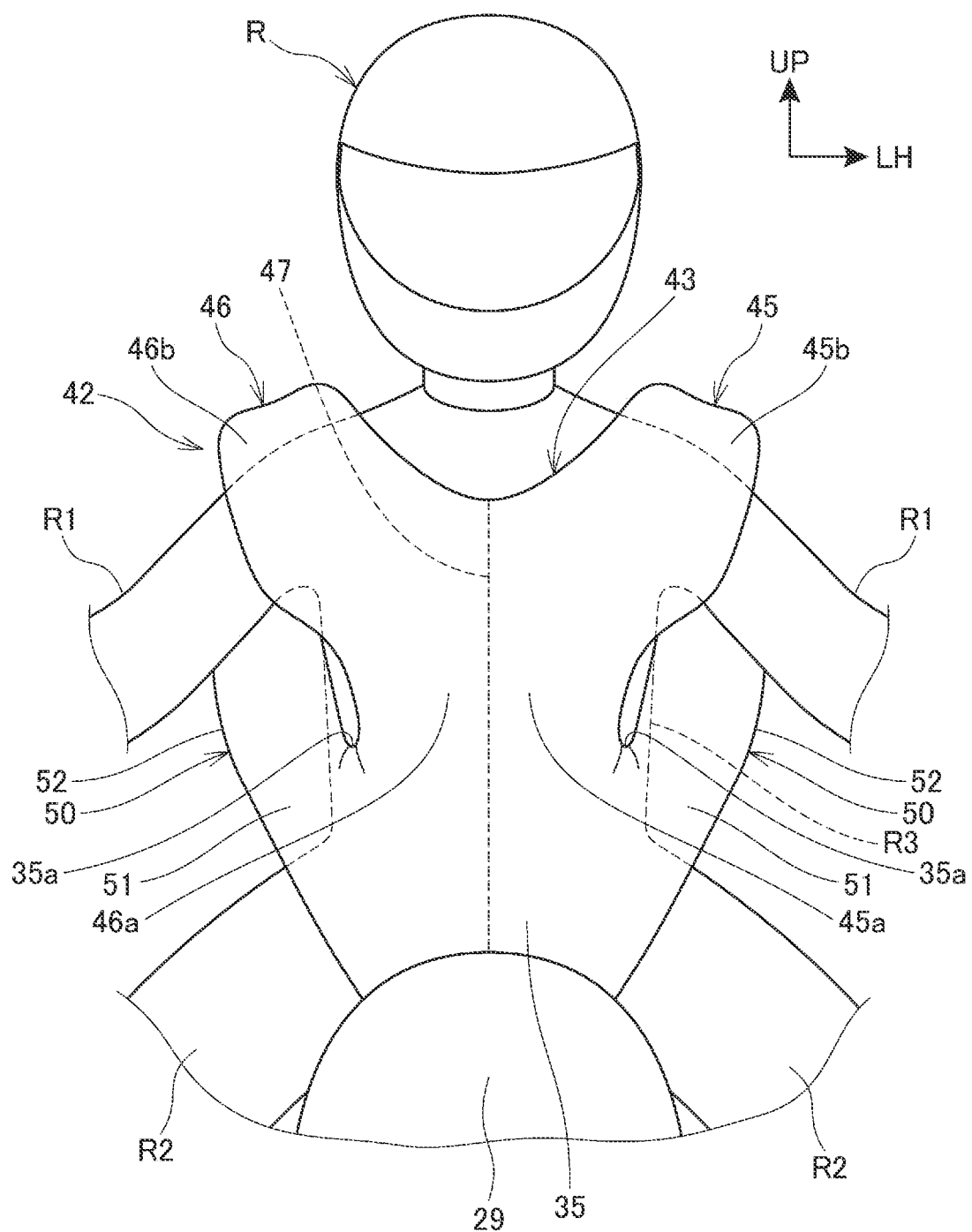
FIG. 3 is a front view of the state, seen from a front side, in which the airbag is deployed to protect the rider.
Figure 4:
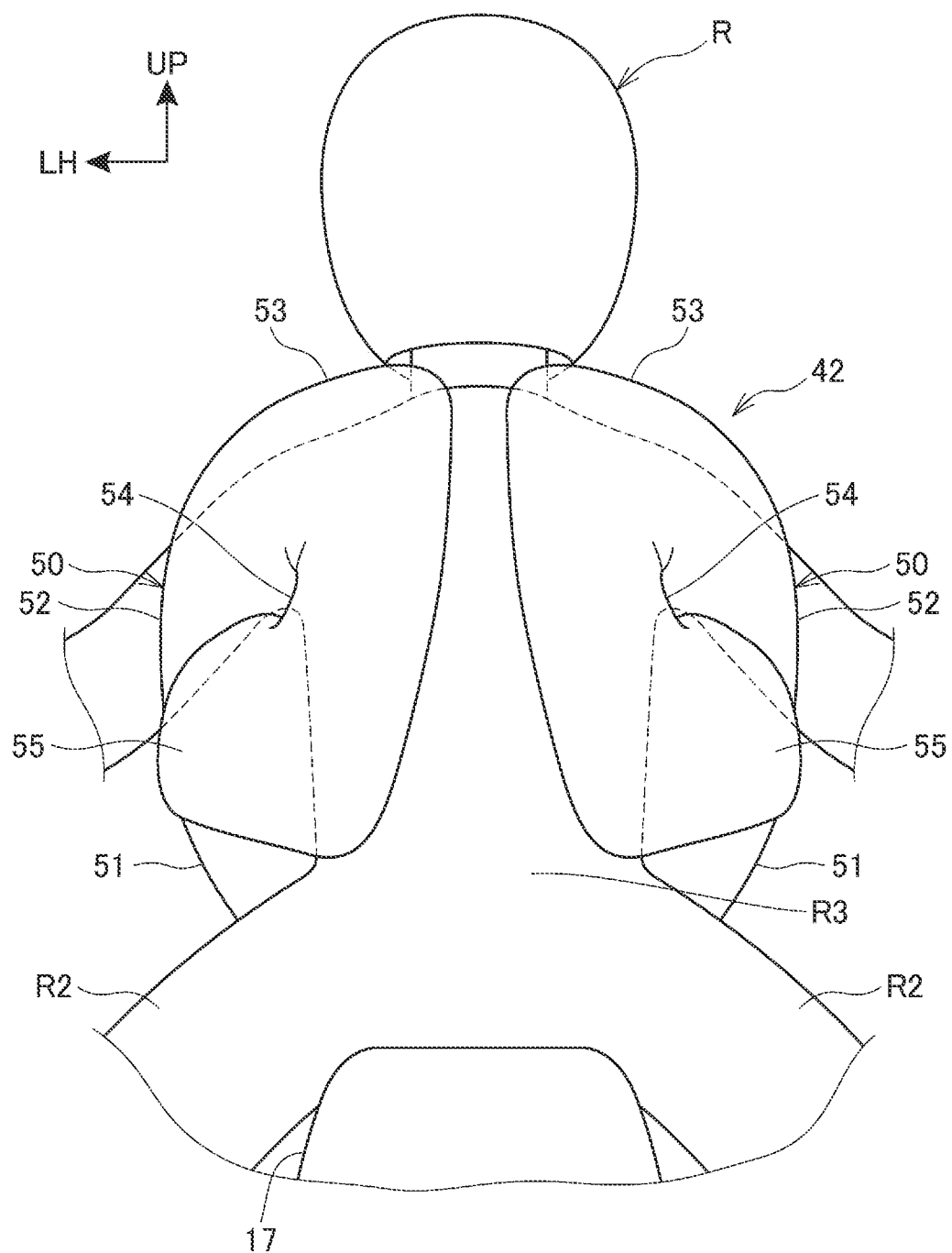
FIG. 4 is a rear view of the state, seen from behind, in which the airbag is deployed to protect the rider.
Figure 5:
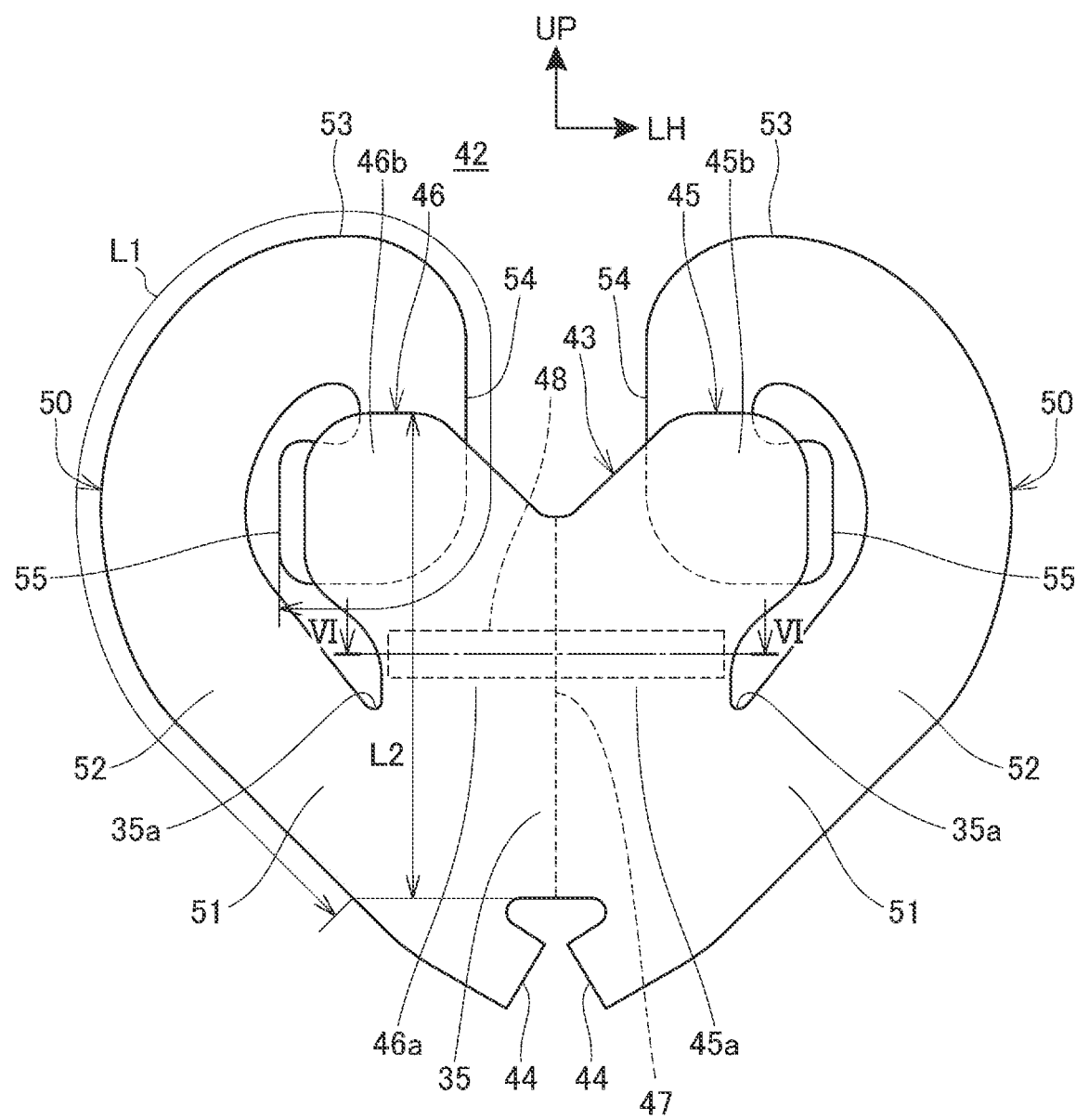
FIG. 5 is a front view of the deployed airbag as seen from the front side.

FIG. 2 is a left side view showing a state in which the airbag 42 is deployed to protect the rider R. FIG. 3 is a front view of a state, seen from the front side, in which the airbag 42 is deployed to protect the rider R. FIG. 4 is a rear view of a state, seen from the rear side, in which the airbag 42 is deployed to protect the rider R. FIG. 5 is a front view of the deployed airbag 42 as seen from the front side.

The airbag 42 includes a first deploying portion 35 that is deployed upward from the airbag storage portion 29a, an upwardly deploying portion 43 that is deployed upward from the first deploying portion 35, and a pair of left and right second deploying portions 50 that branch from the first deploying portion 35 and extend outward in the vehicle width direction.

Furthermore, the airbag 42 includes inflator connecting portions 44 connected to the inflator 41 at the lower end portion of the first deploying portion 35.

Figure 6:
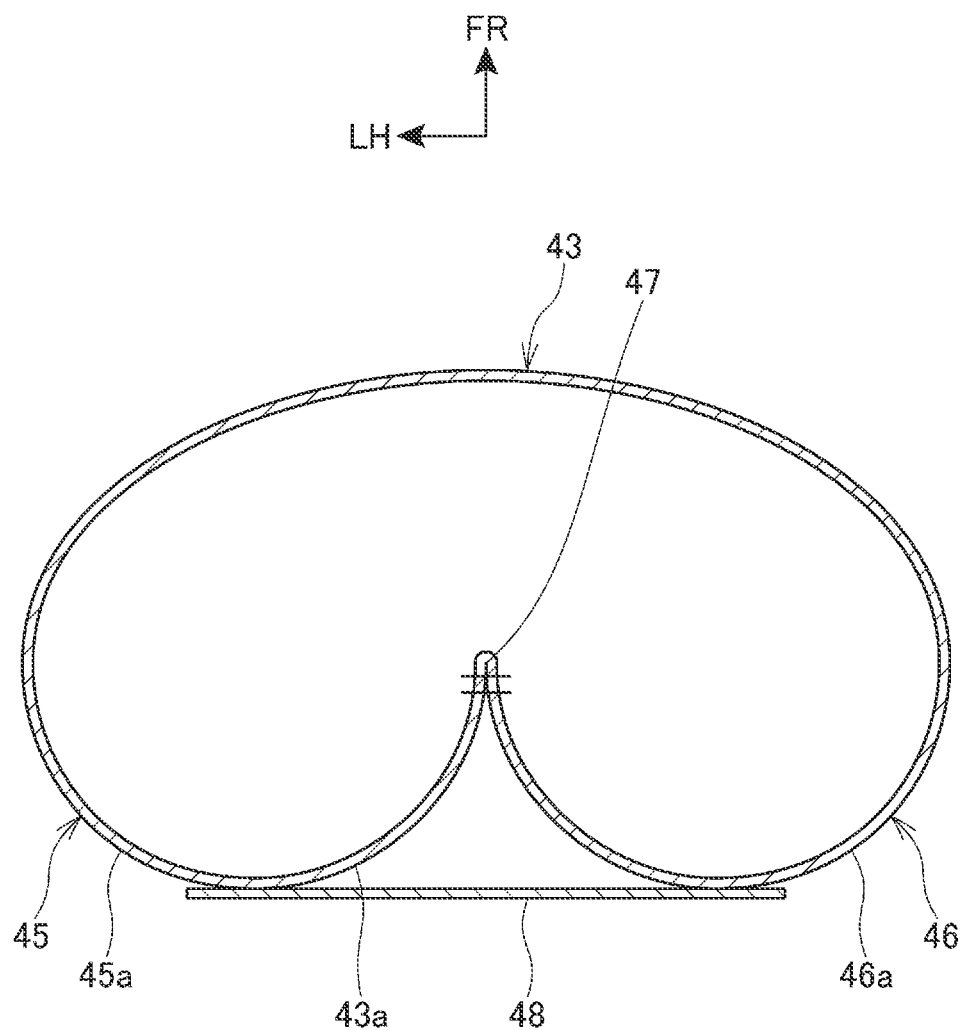
FIG. 6 is a cross-sectional view taken along a VI-VI in FIG. 5.

FIG. 6 is a cross-sectional view taken along a VI-VI in FIG. 5.

With reference to FIGS. 2 to 6, the first deploying portion 35 is the base portion of the airbag 42 with the airbag 42 deployed. The first deploying portion 35 is disposed at the center in the vehicle width direction and covers the lower part of the torso R3 of the rider R from the front side.

The upwardly deploying portion 43 extends upward from the upper end of the first deploying portion 35. The upwardly deploying portion 43 communicates with the first deploying portion 35. The upwardly deploying portion 43 is disposed at the center in the vehicle width direction and covers the torso R3 of the rider R from the front side.

The upwardly deploying portion 43 integrally includes a one-side upwardly deploying portion 45 that extends upward from the first deploying portion 35 on one side in the left-right direction with respect to the center in the vehicle width direction, and the other-side upwardly deploying portion 46 that extends upward from the first deploying portion 35 on the other side in the left-right direction with respect to the center in the vehicle width direction.

The one-side upwardly deploying portion 45 and the other-side upwardly deploying portion 46 are connected in the vehicle width direction (left-right direction) and extend upward substantially parallel to each other.

In a front view, the one-side upwardly deploying portion 45 includes a first upwardly extending portion 45a that extends substantially vertically upward from the upper end of the first deploying portion 35, and an upper extending portion 45b that extends diagonally outward in the vehicle width direction and upward from the upper end of the first upwardly extending portion 45a.

Furthermore, in a front view, the other-side upwardly deploying portion 46 includes a first upwardly extending portion 46a that extends substantially vertically upward from the upper end of the first deploying portion 35, and an upper extending portion 46b that extends diagonally outward in the vehicle width direction and upward from the upper end of the first upwardly extending portion 46a.

The upwardly deploying portion 43 includes a partition portion 47, on the rear surface 43a of the upwardly deploying portion 43, that partitions the space inside the upwardly deploying portion 43 in left and right into the one-side upwardly deploying portion 45 and the other-side upwardly deploying portion 46.

The partition portion 47 is a wall portion formed by sewing to couple the center portions in the vehicle width direction in the rear surface 43a so as to protrude forward. The partition portion 47 protrudes into the upwardly deploying portion 43. The partition portion 47 extends up and down in the deploying direction of the upwardly deploying portion 43 at the central position of the upwardly deploying portion 43 in the vehicle width direction.

The partition portion 47 is provided only in the rear part of the upwardly deploying portion 43, and the one-side upwardly deploying portion 45 and the other-side upwardly deploying portion 46 communicate with each other in the front part of the upwardly deploying portion 43.

Furthermore, the partition portion 47 extends through the center portion in the left and right of the rear surface of the first deploying portion 35 to the lower edge of the first deploying portion 35. In other words, the first deploying portion 35 is also partitioned into left and right sides by the partition portion 47.

The rear surface 43a of the upwardly deploying portion 43 has a connecting member 48 attached thereto that connects the rear surface of the one-side upwardly deploying portion 45 and the rear surface of the other-side upwardly deploying portion 46 in the vehicle width direction.

The connecting member 48 is a belt-shaped string extending in the vehicle width direction. The connecting member 48 extends substantially horizontally in the vehicle width direction with the upwardly deploying portion 43 deployed.

The connecting member 48 is provided in the middle part in the up-down direction of a deploying portion formed by the first deploying portion 35 and the upwardly deploying portion 43. The connecting member 48 connects the first upwardly extending portion 45a and the first upwardly extending portion 46a.

In the deployed state, the upwardly deploying portion 43 and the first deploying portion 35 bend in a V-shape from the partition portion 47, in a top view as shown in FIG. 6. As shown in FIG. 5, the upwardly deploying portion 43 and the first deploying portion 35 bend, in a V-shape that opens rearward, at the partition portion 47 that is a bending line in a front view. Thereby, in the deployed state, the shape of the rear surface 43a of the upwardly deploying portion 43 is a V-shape along the front surface of the torso R3. This allows the upwardly deploying portion 43 and the first deploying portion 35 to be properly in close contact with the torso R3.

The connecting member 48 restricts the degree of bending of the upwardly deploying portion 43 in the deployed state, and makes the upwardly deploying portion 43 and the first deploying portion 35 into a proper V-shape. This allows the upwardly deploying portion 43 and the first deploying portion 35 to be properly in close contact with the torso R3.

The inflator connecting portions 44 (FIG. 5) are provided in the lower end portion of the first deploying portion 35, below the one-side upwardly deploying portion 45 and below the other-side upwardly deploying portion 46, respectively.

The inflator connecting portions 44 are inlets of gas that deploy the airbag 42. The gas released by the inflator 41 flows into the first deploying portion 35 from the inflator connecting portions 44, branches from the first deploying portion 35, and flows to the upwardly deploying portion 43 and the second deploying portions 50.

Note that the inflator connecting portions 44 are respectively provided below the one-side upwardly deploying portion 45 and the other-side upwardly deploying portion 46, but just one inflator connecting portion 44 that is provided in at least one position is needed.

Each second deploying portion 50 has a rod shape that extends outward in the vehicle width direction from each lateral side portion in the outer side in the vehicle width direction of the first deploying portion 35. The second deploying portion 50 has a rod shape that is thinner than the upwardly deploying portion 43.

The proximal end portion of the second deploying portion 50 communicates with the inside of the first deploying portion 35.

Specifically, the second deploying portion 50 includes a laterally extending portion 51 that extends outward in the vehicle width direction from the first deploying portion 35, a rearwardly extending portion 52 that extends rearward from the laterally extending portion 51, an inner bending portion 53 that bends inward in the vehicle width direction from the rearwardly extending portion 52, a downwardly extending portion 54 that bends from the inner bending portion 53 and extends downward, and a folded-back portion 55 that is folded back from the lower end portion of the downwardly extending portion 54 toward the rearwardly extending portion 52 on the front side.

Each laterally extending portion 51 is the proximal end portion of the second deploying portion 50. The laterally extending portion 51 extends from the lower part of the deploying portion formed by the first deploying portion 35 and the upwardly deploying portion 43.

In the front view of FIG. 5, the upper end 35a of the first deploying portion 35 is located at the upper end of the connecting portion between the laterally extending portion 51 and the first deploying portion 35.

Each rearwardly extending portion 52 extends rearward from the outer end portion in the vehicle width direction of the laterally extending portion 51 toward the rear side of the seat 17.

The rearwardly extending portion 52 has a rod shape that extends diagonally rearward and upward from the laterally extending portion 51 in a vehicle side view, and is thinner than the upwardly deploying portion 43.

The rearwardly extending portion 52 extends from the laterally extending portion 51 through between: the arm R1 of the rider R sitting on the seat 17 and grasping the handle 21; and the leg R2 of the rider R, and extends to the rear side of the rider R along the outer side surface of the torso R3.

Each rearwardly extending portion 52 extends diagonally rearward and upward in a vehicle side view. The rearwardly extending portion 52 forms a section from the laterally extending portion 51 to the inner bending portion 53, and extends to be progressively located toward the outer side in the vehicle width direction as the rearwardly extending portion 52 extends rearward. The rearwardly extending portion 52 extends rearward along the outer side surface of the torso R3.

Each inner bending portion 53 is provided at the end portion of the rearwardly extending portion 52 in the extending direction. The inner bending portion 53 is located behind and above the laterally extending portion 51. The inner bending portion 53 turns to the rear surface side of the torso R3 and is in contact with the back of the rider R.

Each downwardly extending portion 54 extends downward from the inner end portion in the vehicle width direction of the inner bending portion 53. The downwardly extending portion 54 extends to be progressively located toward the outer side in the vehicle width direction as the downwardly extending portion 54 extends downward. The downwardly extending portion 54 extends downward along the back of the rider R. The downwardly extending portion 54 is located behind and above the laterally extending portion 51.

Each folded-back portion 55 extends toward the rearwardly extending portion 52 extending rearward and upward in front of the folded-back portion 55, and is in contact with the rearwardly extending portion 52 from the rear side. Note that the folded-back portion 55 may be close to the rearwardly extending portion 52 from the rear side without being in contact with the rearwardly extending portion 52. Alternatively, there may be a configuration in which the second deploying portions 50 include no folded-back portion 55 and the downwardly extending portion 54 bends toward the rearwardly extending portion 52 on the front side.

With the airbag 42 deployed, the airbag 42 surrounds the rider R and is in close contact with the rider R.

Specifically, the first deploying portion 35 and the upwardly deploying portion 43 are in contact with the torso R3 from the front side, to protect the torso R3. The upper extending portions 45b and 46b of the upwardly deploying portion 43 cover the shoulders of the rider R from the front side.

The left and right laterally extending portions 51 are located below the arms R1. Each laterally extending portion 51 extends outward in the vehicle width direction through between the arm R1 and the leg R2, and extends outward in the vehicle width direction relative to the lower part of the torso R3.

Each rearwardly extending portion 52 is in contact with the outer side surface of the torso R3 below the arm R1 to protect the torso R3. The rearwardly extending portion 52 extends rearward and upward along the arm R1.

Each inner bending portion 53 and each downwardly extending portion 54 are in contact with the back of the rider R to protect the back.

Each folded-back portion 55 is in contact with the outer side surface of the torso R3 below the rearwardly extending portion 52 to protect the torso R3. Furthermore, the folded-back portion 55 is in contact with the rearwardly extending portion 52 from the rear side to suppress deformation of the overall shape of the second deploying portion 50 and maintain the second deploying portion 50 in an appropriate shape.

The airbag 42 has the laterally extending portions 51 passing below the arms R1, so that the laterally extending portions 51 are not likely to get in the way of the arms R1 and are properly in close contact with the rider R via the upwardly deploying portion 43 and the laterally extending portions 51. Additionally, the airbag 42 has the laterally extending portions 51 sandwiched between the arms R1 and the legs R2, to be properly in close contact with the rider R.

The airbag 42 sandwiches the rider R in the vehicle front-rear direction with: the first deploying portion 35 and the upwardly deploying portion 43; and the inner bending portions 53 and the downwardly extending portions 54 of the second deploying portions 50. Additionally, the airbag 42 sandwiches the rider R in the left-right direction with the left and right rearwardly extending portions 52 and the left and right folded-back portions 55. Therefore, the airbag 42 is properly in close contact with the rider R.

At least part of each inner bending portion 53 overlaps the upwardly deploying portion 43 in the vehicle front-rear direction. In other words, in the front view shown in FIG. 3, the upwardly deploying portion 43 overlaps at least part of the inner bending portion 53 (FIG. 4) from the front side. This allows the inner bending portions 53 and the upwardly deploying portion 43 to sandwich the rider R between the front and the rear, allowing the airbag 42 to be effectively in close contact with the rider R.

Each second deploying portion 50 is rod-shaped and has a small volume, resulting in quick deployment.

With reference to FIG. 5, with the airbag 42 deployed, a length L1 of each second deploying portion 50 in the deploying direction is longer than a length L2 that is the sum of lengths of the first deploying portion 35 and the upwardly deploying portion 43 in the deploying direction.

The airbag device 40 is provided with a separating mechanism 49 (FIG. 1) that separates the airbag 42 from the inflator 41 after the airbag 42 is deployed. The separating mechanism 49 is operated, for example, by the pressure of gas within the airbag 42, to separate the airbag 42 from the inflator 41. Alternatively, the separating mechanism 49 may melt part of the airbag 42 with heat to separate the airbag 42 from the inflator 41.

When the inflator 41 operates and the airbag 42 is deployed, the airbag 42 comes into close contact with the rider R and is separated from the inflator 41. Therefore, after the airbag 42 is deployed, the airbag 42 is prevented from being pulled by the inflator 41 and being shifted from the rider R.

The separating mechanism 49 includes a check valve (not shown) that suppresses the outflow of gas from the separated airbag 42. Therefore, after being separated, the airbag 42 maintains the inflated state and is properly in close contact with the rider R.

As described above, according to the embodiment to which the present invention is applied, the saddled vehicle 10 includes the seat 17 for a rider and the airbag 42 provided in front of the seat 17; the airbag 42 includes a first deploying portion 35 that is deployed upward when deployed, an upwardly deploying portion 43 that is deployed upward from the first deploying portion 35 when deployed, and second deploying portions 50 that branch and extend from the first deploying portion 35 when deployed; and the second deploying portions 50 extend outward in the vehicle width direction from the first deploying portion 35.

This configuration causes the upwardly deploying portion 43 to be deployed upward from the first deploying portion 35 and the second deploying portions 50 to be extended outward in the vehicle width direction from the first deploying portion 35, allowing the airbag 42 to be compact and allowing the airbag 42 to be prevented from being obstructed by the arms R1 of the rider R to properly protect the rider R with the airbag 42.

Furthermore, each second deploying portion 50 also includes the laterally extending portion 51 extending outward in the vehicle width direction from the first deploying portion 35 and the rearwardly extending portion 52 extending rearward from the laterally extending portion 51.

This configuration allows the airbag 42 to be effectively in close contact with the rider R via the laterally extending portions 51 and the rearwardly extending portions 52, and allows the rearwardly extending portions 52 to protect the lateral side of the rider R.

Furthermore, each second deploying portion 50 includes the inner bending portion 53 that bends inward in the vehicle width direction from the rearwardly extending portion 52. At least part of each inner bending portion 53 overlaps the upwardly deploying portion 43 in the vehicle front-rear direction.

This configuration allows the inner bending portions 53 to protect the rider R from behind, and allows the inner bending portions 53 and the upwardly deploying portion 43 to effectively bring the airbag 42 into close contact with the rider R so as to sandwich the rider R between the front and the rear.

Furthermore, each rearwardly extending portion 52 extends to be progressively located toward the outer side in the vehicle width direction as the rearwardly extending portion 52 extends rearward until reaching the inner bending portion 53.

This configuration allows the rearwardly extending portions 52 to be properly deployed rearward along the rider R.

Additionally, each second deploying portion 50 includes the downwardly extending portion 54 that bends from the inner bending portion 53 and extends downward.

This configuration allows the inner bending portions 53 and the downwardly extending portions 54 to protect the rider R from behind over a large area. Furthermore, this configuration allows the airbag 42 to be effectively in close contact with the rider R by the downwardly extending portions 54.

Furthermore, each rearwardly extending portion 52 extends diagonally rearward and upward in a vehicle side view.

This configuration causes the inner bending portion 53 extending from the rearwardly extending portion 52 to be located higher, allowing the inner bending portion 53 and the downwardly extending portion 54 to be provided in a large area in the up-down direction. Therefore, the inner bending portion 53 and the downwardly extending portions 54 can effectively protect the rider R. Furthermore, the high position of the rider R can be protected, facilitating protection of the area of the head and neck.

Furthermore, each second deploying portion 50 includes the folded-back portion 55 that is folded back from the downwardly extending portion 54 toward the rearwardly extending portion 52.

This configuration allows the folded-back portion 55 to protect the rider R. Furthermore, the folded-back portion 55 is in contact with the rearwardly extending portion 52, allowing the second deploying portion 50 to be easily maintained in an appropriate shape.

Furthermore, with the airbag 42 deployed, the length L1 of each second deploying portion 50 in the deploying direction is longer than the length L2 that is the sum of lengths of the first deploying portion 35 and the upwardly deploying portion 43 in the deploying direction.

This configuration causes the second deploying portion 50 to be long, allowing the second deploying portion 50 to effectively hold the rider R. Furthermore, the first deploying portion 35 and the upwardly deploying portion 43 are short, allowing the first deploying portion 35 and the upwardly deploying portion 43 to be deployed quickly.

Furthermore, the upwardly deploying portion 43 is deployed upward along the front surface of the torso R3 of the rider R sitting on the seat 17. The second deploying portions 50 extend outward in the vehicle width direction through between: the arms R1 of the rider R sitting on the seat 17 and grasping the handle 21 for steering; and the legs R2 of the rider R.

This configuration allows each second deploying portion 50 to be prevented from getting in the way of the arm R1, and allows the airbag 42 to be properly in close contact with the rider via the second deploying portion 50 being sandwiched between the arm R1 and the leg R2. The second deploying portion 50 has a size that allows it to pass between the arm R1 and the leg R2, allowing the second deploying portion 50 to be compact.

Furthermore, each second deploying portion 50 has a rod shape that extends outward in the vehicle width direction from the first deploying portion 35, and has a rod shape that is thinner than the upwardly deploying portion 43.

This configuration, which has the second deploying portions 50 in a rod shape, allows the second deploying portions 50 to reduce the volume and allows the second deploying portion 50 to be effectively in close contact with the rider R.

Furthermore, the inflator connecting portions 44 that are the inlets of gas that deploys the airbag 42 are provided in the first deploying portion 35.

This configuration causes each inflator connecting portion 44 and the second deploying portion 50 to be provided in the first deploying portion 35, so that the inflator connecting portion 44 is close to the second deploying portions 50. This allows gas to efficiently flow to the second deploying portion 50, allowing the second deploying portion 50 to be deployed quickly.

Note that although the inflator connecting portion 44 is provided at the lower end portion of the first deploying portion 35, the position is not limited to this, and the inflator connecting portion 44 may be provided at a position below the middle part in the up-down direction of the upwardly deploying portion 43.

The upwardly deploying portion 43 includes the one-side upwardly deploying portion 45 that extends upward on one side in a left-right direction, the other-side upwardly deploying portion 46 that extends upward on the other side in the left-right direction, and the partition portion 47 that partitions the space in the upwardly deploying portion 43 into the one-side upwardly deploying portion 45 and the other-side upwardly deploying portion 46; the partition portion 47 is provided at least on the rear surface 43*a* of the upwardly deploying portion 43; the upwardly deploying portion 43 is bendable from the partition portion 47 extending in the up-down direction; and a connecting member 48 is attached to the rear surface 43*a* of the upwardly deploying portion 43 to connect the one-side upwardly deploying portion 45 and the other-side upwardly deploying portion 46 in the left-right direction.

This configuration allows the upwardly deploying portion 43 to be bent from the partition portion 47 where the one-side upwardly deploying portion 45 and the other-side upwardly deploying portion 46 each extend in the up-down direction, allowing the upwardly deploying portion 43 to be placed along the rider R to properly protect the rider R with the airbag 42. Additionally, the connecting member 48 can restrict the bending state of the one-side upwardly deploying portion 45 and the other-side upwardly deploying portion 46, allowing the upwardly deploying portion 43 to be effectively placed along the rider R.

Additionally, an inflator 41 that jets gas into the airbag 42 to deploy the airbag 42 is connected to the airbag 42, and a separating mechanism 49 is provided that separates the airbag 42 from the inflator 41 after the airbag 42 is deployed.

This configuration causes the airbag 42 to be separated from the inflator 41 after the airbag 42 is deployed, preventing the airbag 42 from being shifted downward by the inflator 41 after the airbag 42 is deployed. Therefore, the airbag 42 can be properly in close contact with the rider R. Furthermore, the airbag 42 can be separated while grasping the rider R.

Note that the above embodiment shows an aspect to which the present invention is applied, and the present invention is not limited to the above embodiment.

In the above embodiment, the airbag 42 is described as being provided in front of the seat 17, but the present invention is not limited to this. The airbag 42 may be provided in the front part of the seat 17 and in front of the seating position of the rider R. Furthermore, the airbag device 40 may be built in the seat 17 to be disposed.

Furthermore, in the above embodiment, the partition portion 47 is described as being provided only in the rear part in the upwardly deploying portion 43, but the present invention is not limited to this. The partition portion 47 may extend from the rear surface 43*a* to the front surface of the upwardly deploying portion 43 so as to completely partition the upwardly deploying portion 43 into the one-side upwardly deploying portion 45 and the other-side upwardly deploying portion 46. Furthermore, the partition portion 47 may be provided only in the front part in the upwardly deploying portion 43.

Furthermore, the second deploying portions 50 are described as being provided in a pair on the left and right, but there may be a second deploying portion 50 that is provided on either of the left and right.

Additionally, in the embodiment described above, a motorcycle is described as an example of the saddled vehicle 10, but the present invention is not limited to this, and the present invention is applicable to a three-wheel saddled vehicle having two front wheels or two rear wheels and a saddled vehicle having four or more wheels.

Second Embodiment

A second embodiment to which the present invention is applied will be described below with reference to FIGS. 7 and 8. In the second embodiment, the same reference signs are given to the portions configured similarly to the portions in the above embodiment (first embodiment), and the description of the portions will be omitted.

In the above embodiment, the second deploying portions 50 extend to the back side of the rider R, but the second embodiment differs from the above embodiment in that second deploying portions 250 are deployed so as to wrap around the arms of the rider R.

Figure 7:
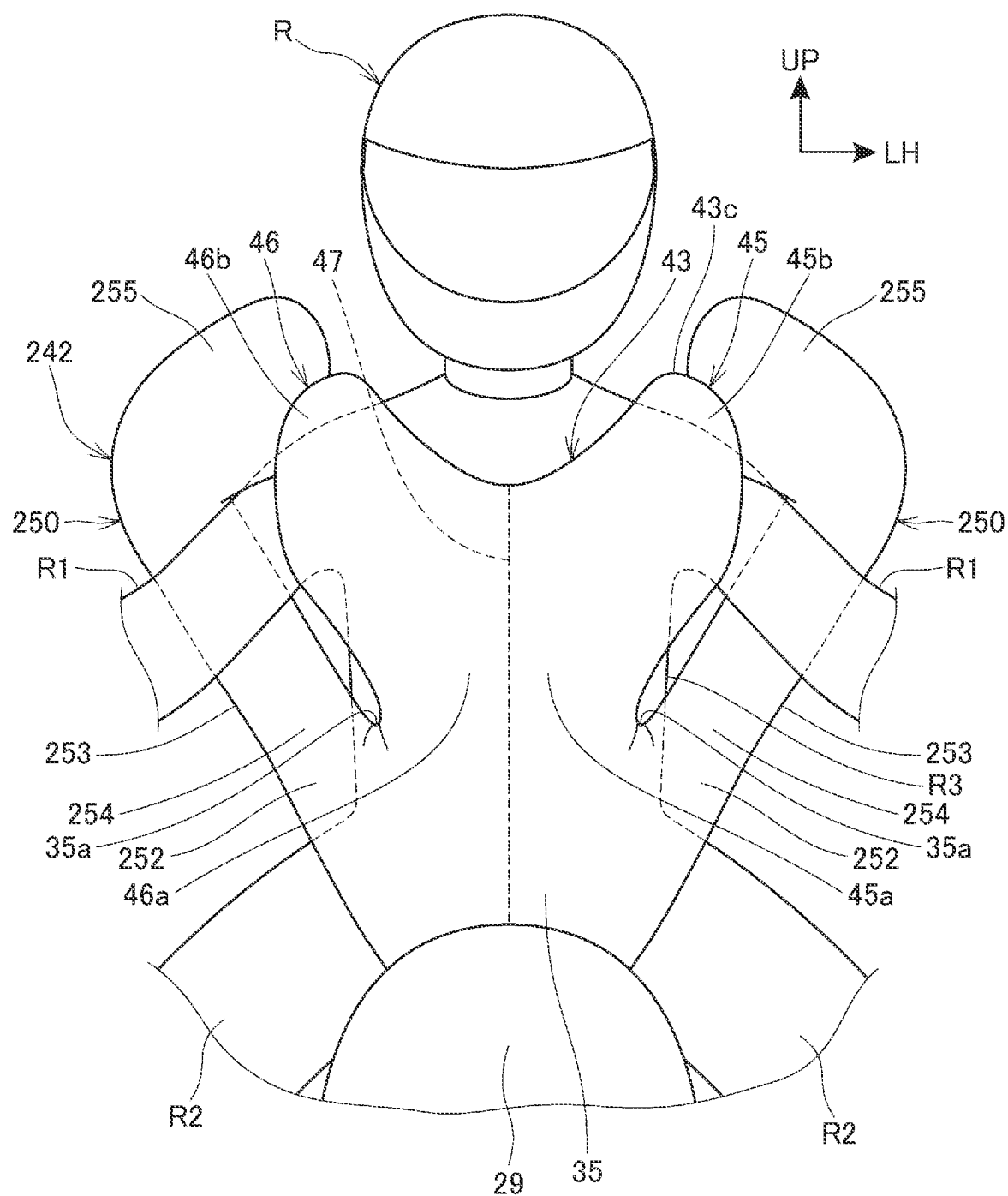
FIG. 7 is a front view of a state, seen from a front side, in which an airbag of a second embodiment is deployed to protect a rider.

FIG. 7 is a front view of a state, seen from the front side, in which an airbag 242 of the second embodiment is deployed to protect the rider R. FIG. 8 is a left side view showing a state in which the airbag 242 is deployed to protect the rider R.

The airbag 242 is stored in the airbag storage portion 29*a* (FIG. 1). The airbag 242 is connected to the inflator 41 via separating mechanism 49.

The airbag 242 includes a first deploying portion 35, the upwardly deploying portion 43, a pair of left and right second deploying portions 250 that branch from the first deploying portion 35 and extend rearward and outward, and the inflator connecting portions 44 (FIG. 5).

The second deploying portions 250 extend from the lower part of the deploying portion formed by the first deploying portion 35 and the upwardly deploying portion 43.

The upper end 35*a* of the first deploying portion 35 is located at the upper end of the connecting portions between the second deploying portions 250 and the first deploying portion 35.

Each second deploying portion 250 includes an extending portion 252 that extends rearward and outward from the lateral side portion of the first deploying portion 35, and a second upwardly extending portion 253 that extends upward from the end portion in the extending direction of the extending portion 252.

Each second deploying portion 250 has a rod shape that is thinner than the upwardly deploying portion 43. A proximal end portion of the second deploying portion 250 communicates with the inside of the first deploying portion 35.

The second deploying portion 250 extends rearward and outward from the first deploying portion 35 through between the arm R1 and the leg R2, and then extends upward.

Specifically, each second upwardly extending portion 253 includes a first extending portion 254 extending upward from the extending portion 252, and a second extending portion 255 extending inward and upward in the vehicle width direction from the upper end of the first extending portion 254. Furthermore, the second extending portion 255 extends diagonally forward and upward in a vehicle side view.

The first extending portion 254 extends upward in a position slightly rear relative to the upwardly deploying portion 43. The first extending portion 254 extends to be progressively located toward the outer side in the vehicle width direction as the first extending portion 254 extends upward.

The second extending portion 255 bends to be progressively located toward the inner side in the vehicle width direction as the second extending portion 255 extends upward.

Each first extending portion 254 extends upward to a position on the outer lateral side of the arm R1. Each second extending portion 255 passes above the arm R1 and extends inward in the vehicle width direction and forward and upward.

The second extending portion 255 extends upward to a position at least as high as the upwardly deploying portion 43. Specifically, the second extending portion 255 extends above the upper surface 43c of the upwardly deploying portion 43. In other words, the second extending portion 255 extends to a position higher than the upwardly deploying portion 43.

It is desirable that the second extending portion 255 extend to the height of the arm R1 of the rider R. The second extending portion 255 only needs to extend to the height of the arm R1, and does not need to extend above the upper surface 43c of the upwardly deploying portion 43. For example, the second extending portion 255 may extend to the same height as the lower part of the upwardly deploying portion 43 or to the same height as the upper part of the upwardly deploying portion 43. In this case, the second extending portion 255 and the upwardly deploying portion 43 can sandwich the arm R1 in the width direction to grasp the arm R1.

With the airbag 242 deployed, the airbag 242 surrounds the rider R and is in close contact with the rider R.

Specifically, the first deploying portion 35 and the upwardly deploying portion 43 are in contact with the torso R3 from the front side, to protect the torso R3. The upper extending portions 45b and 46b of the upwardly deploying portion 43 cover the shoulders of the rider R from the front side.

The left and right extending portions 252 are located below the arms R1. Each extending portion 252 extends outward in the vehicle width direction through between the arm R1 and the leg R2, and extends outward in the vehicle width direction relative to the lower part of the torso R3.

Each first extending portion 254 of the second upwardly extending portion 253 covers and protects the torso R3 and the arm R1 from the outer lateral side.

Each second extending portion 255 of the second upwardly extending portion 253 turns inward in the vehicle width direction above the arm R1 on the rear side of the upwardly deploying portion 43, and is in contact with the arm R1 from above. The distal end portion of the second extending portion 255 may be in contact with the upper end portion of the upwardly deploying portion 43.

In the front view of FIG. 7, the upper end portion of the upwardly deploying portion 43 overlaps at least part of the second extending portion 255 from the front side.

The airbag 242 has the first deploying portion 35, the upwardly deploying portion 43, the extending portions 252, and the first extending portions 254 and the second extending portions 255 of the second upwardly extending portions 253 that sandwich the rider R from multiple directions. The airbag 242 is deployed so as to wrap around the arms R1. Therefore, the airbag 242 is properly in close contact with the rider R.

Each second deploying portion 250 is rod-shaped and has a small volume, resulting in quick deployment.

With the airbag 242 deployed, the length of the second deploying portion 250 in the deploying direction is longer than the length that is the sum of lengths of the first deploying portion 35 and the upwardly deploying portion 43 in the deploying direction.

As described above, according to the second embodiment to which the present invention is applied, each second deploying portion 250 includes an extending portion 252 that extends posterolaterally from the first deploying portion 35, and a second upwardly extending portion 253 that extends upward from the extending portion 252 to at least the position of the upwardly deploying portion 43.

This configuration allows the second deploying portion 250 to protect the rider R, and allows the upwardly deploying portion 43 and the second deploying portions 250 to properly bring the airbag 242 into close contact with the rider R so as to sandwich the rider R.

Furthermore, the second upwardly extending portions 253 extend above the upper surface 43c of the upwardly deploying portion 43.

This configuration allows the second upwardly extending portions 253 to properly protect the high position of the rider R.

Figure 9:
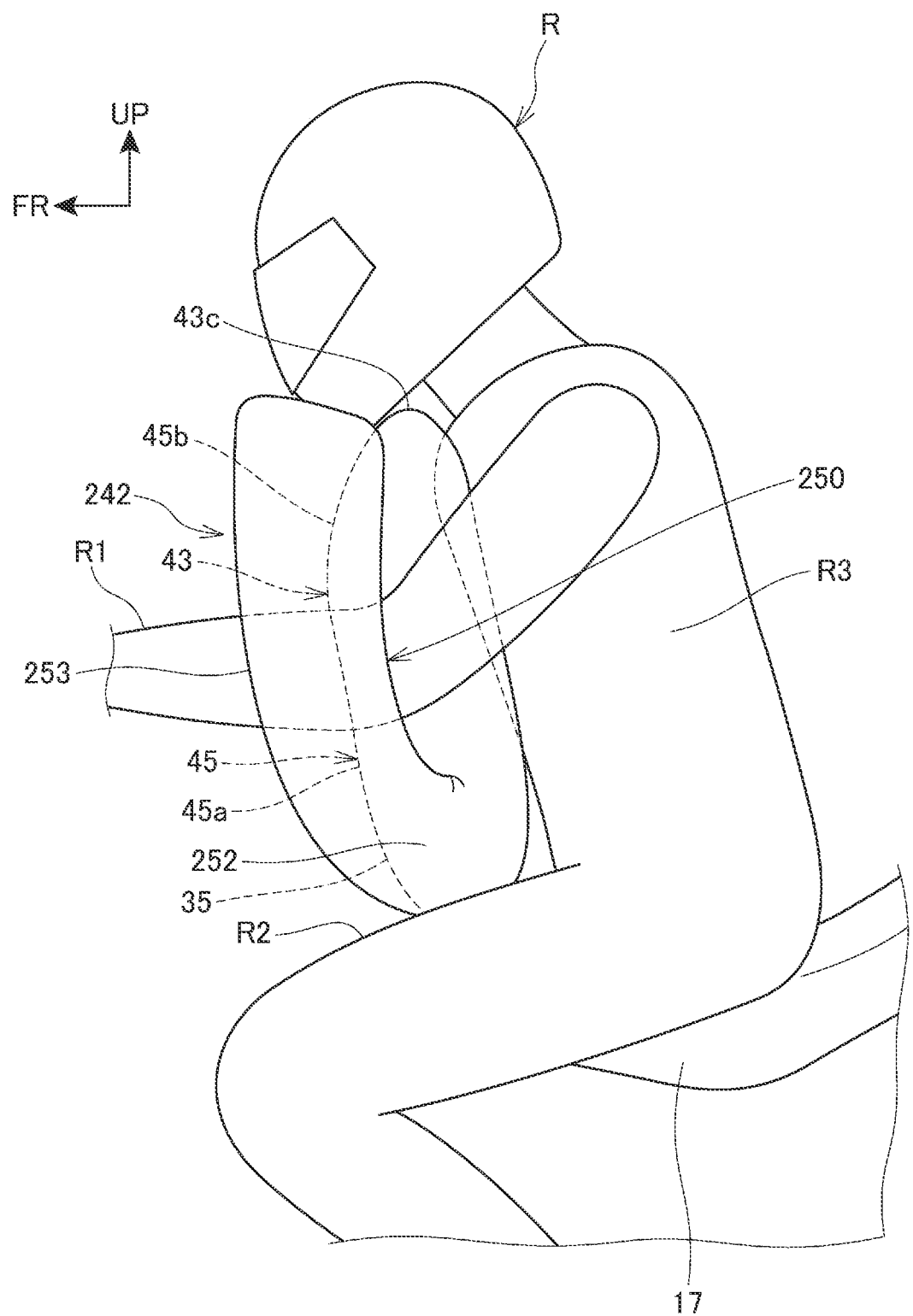
FIG. 9 is a left side view showing Modification 1 of the second embodiment.

FIG. 9 is a left side view showing Modification 1 of the second embodiment.

Figure 8:
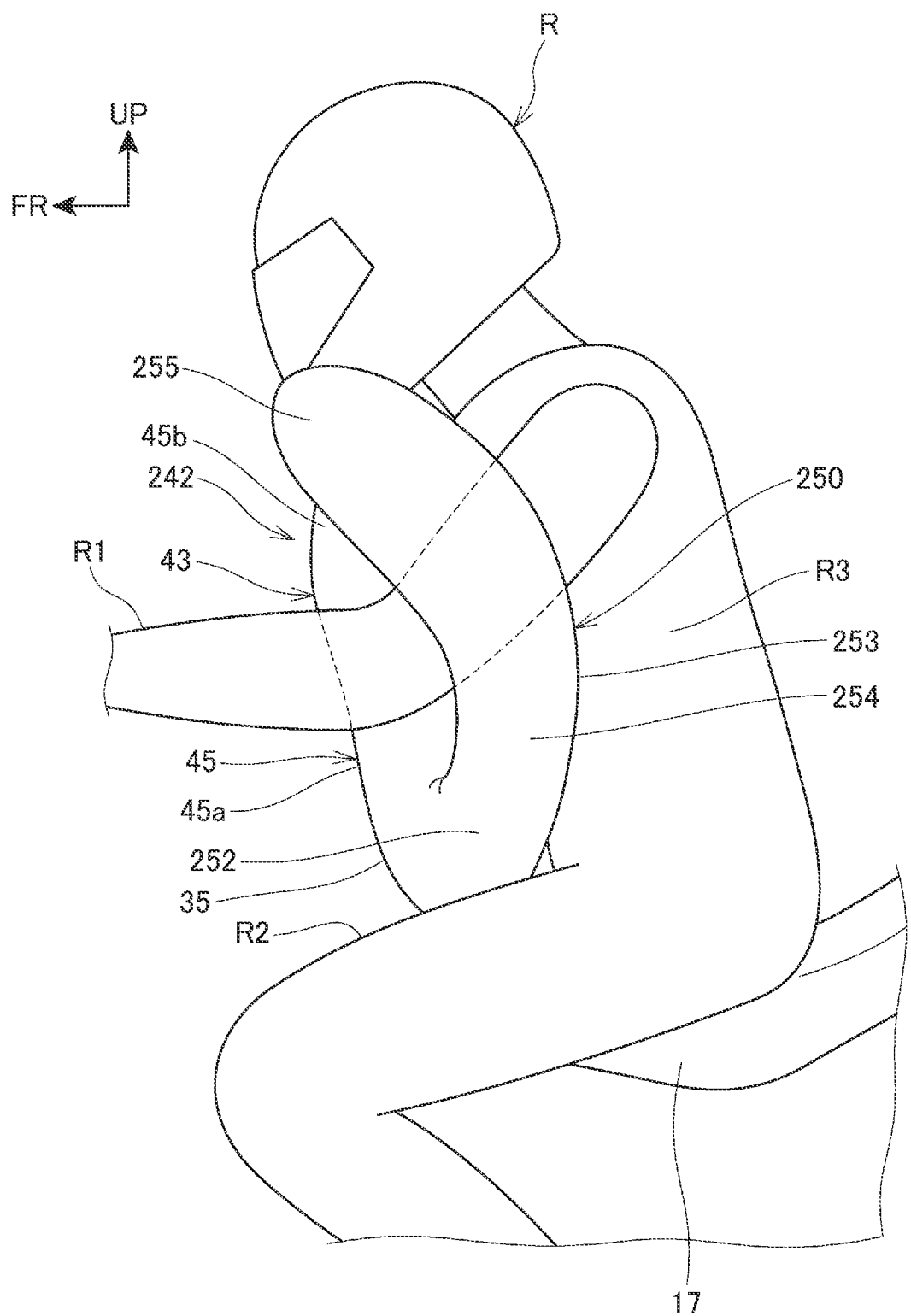
FIG. 8 is a left side view showing a state in which the airbag is deployed to protect the rider.

In FIG. 8, the second upwardly extending portions 253 extend upwardly through the rear side of the upwardly deploying portion 43, but the second upwardly extending portions 253 may extend upwardly through the front side of the upwardly deploying portion 43, as shown in FIG. 9.

In Modification 1, each extending portion 252 extends outward in the vehicle width direction from the lateral side portion of the first deploying portion 35. More specifically, the extending portion 252 extends forward and outward from the first deploying portion 35.

Figure 10:
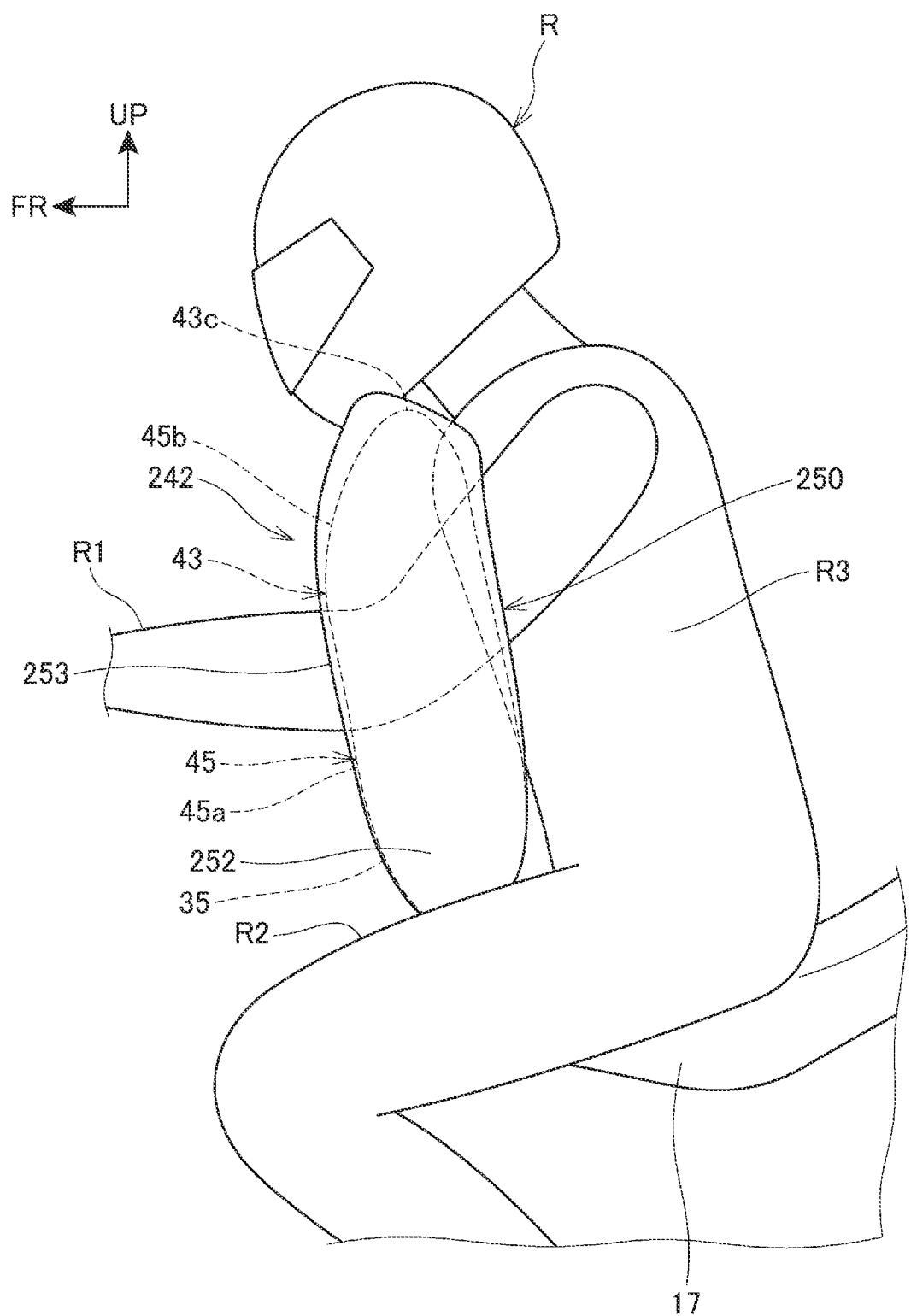
FIG. 10 is a left side view showing Modification 2 of the second embodiment.

FIG. 10 is a left side view showing Modification 2 of the second embodiment.

In FIG. 8, the second upwardly extending portions 253 extend upwardly through the rear side of the upwardly deploying portion 43, but as shown in FIG. 10, each second upwardly extending portion 253 may extend upward substantially parallel to the upwardly deploying portion 43 through a position where the second upwardly extending portion 253 substantially entirely overlaps the upwardly deploying portion 43 from the outside in the vehicle width direction in a vehicle side view.

In Modification 2, each extending portion 252 extends outward in the vehicle width direction almost right sideways, from the lateral side portion of the first deploying portion 35.

Note that the extending portion 252 may extend rearward from the first deploying portion 35. In this case, the second upwardly extending portion 253 extends upward from the rear end portion of the extending portion 252 and wraps around the arm R1.

Third Embodiment

A third embodiment to which the present invention is applied will be described below with reference to FIG. 11. In the third embodiment, the same reference signs are given to the portions configured similarly to the portions in the above embodiment (first embodiment), and the description of the portions will be omitted.

The third embodiment differs from the above embodiments in that the airbag device 40 is mounted on a scooter saddled vehicle 310.

Figure 11:
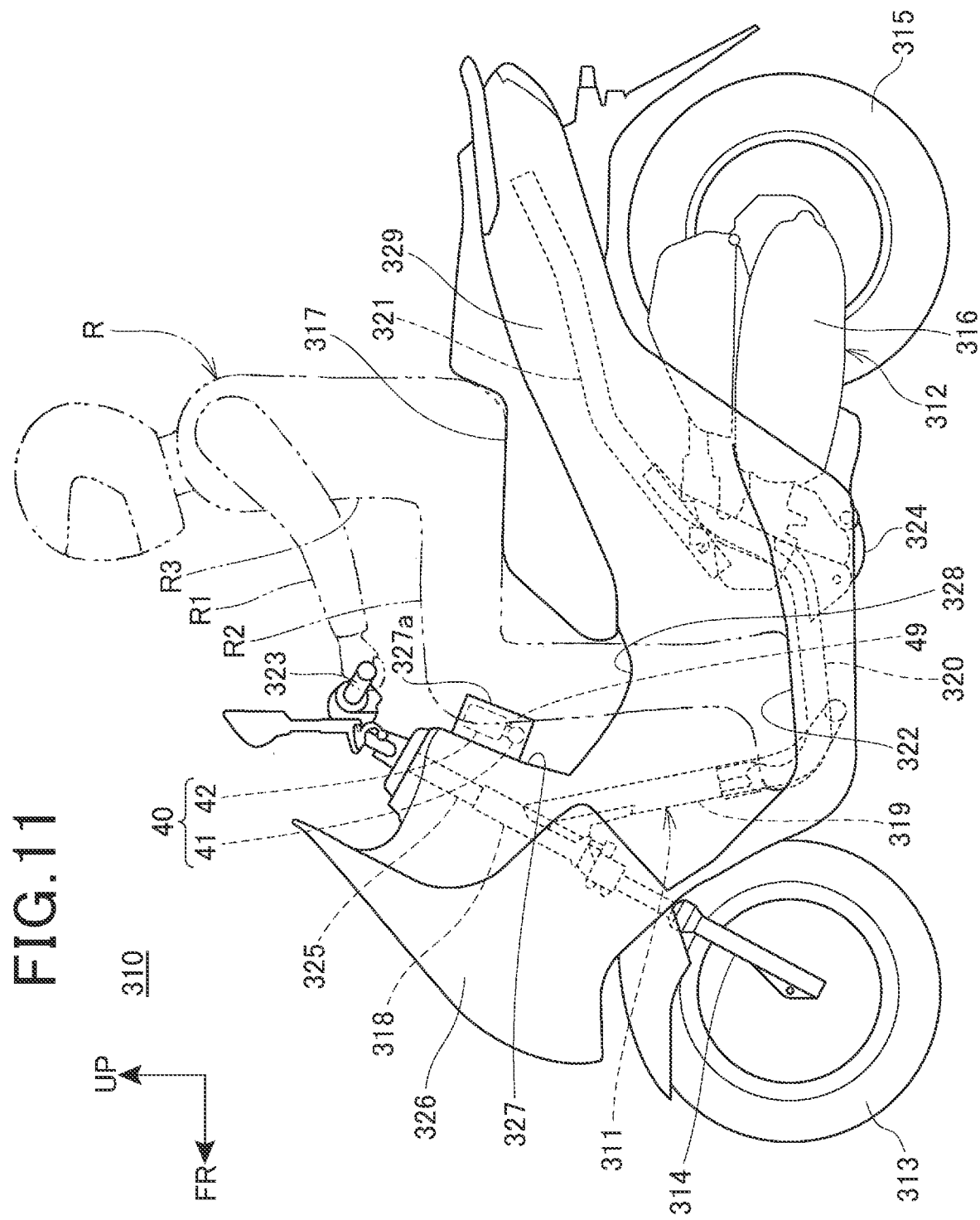
FIG. 11 is a left side view of a saddled vehicle according to a third embodiment.

FIG. 11 is a left side view of a saddled vehicle 310 according to the third embodiment.

The saddled vehicle 310 is a vehicle that includes a vehicle body frame 311, a power unit 312 supported on the vehicle body frame 311, a front fork 314 that supports a front wheel 313 in a steerable manner, a swing arm 316 that supports a rear wheel 315, and a seat 317 for a rider.

The saddled vehicle 310 is a scooter motorcycle in which a rider R sits astride a seat 317. The seat 317 is provided above the rear part of the vehicle body frame 311. A floor-like step floor 322 on which the rider R puts his or her feet is provided below the front of the seat 317.

The vehicle body frame 311 includes a head pipe 318 provided at the front end portion of the vehicle body frame 311, a down frame 319 extending downward from the head pipe 318, a lower frame 320 extending rearward from the lower end portion of the down frame 319, and a seat frame 321 extending rearward and upward from the rear end portion of the lower frame 320. The seat 317 is supported on the seat frame 321.

The front fork 314 is supported on the head pipe 318 so as to be steerable left and right. A handle 323 for steering that the rider R grasps is mounted at an upper end portion of the front fork 314.

The power unit 312 is a unit swing engine in which an engine (internal combustion engine), which is a drive source for the rear wheel 315, and a swing arm 316 are integrally provided. The power unit 312 is located directly below the seat 317 in a vehicle side view.

The power unit 312 is connected to the rear part of the vehicle body frame 311 via a link member 324 connected to the front part of the power unit 312, and swings up and down around the link member 324.

The saddled vehicle 310 has a vehicle body cover including: a front cover 326 that covers the front end portion of the vehicle body frame 311 from the front, and left and right lateral sides; an inner cover 327 that covers the head pipe 318 and the down frame 319 from behind; a center tunnel portion 328, located below the seat 317 and between the down frame 319 and the seat frame 321, that covers the vehicle body from above and both left and right lateral sides; and a rear cover 329 that covers the vehicle body below the seat 317 behind the center tunnel portion 328 from the left and right lateral sides.

The inner cover 327 is a leg shield that covers the legs R2 of the rider R, sitting on the seat 317, from the front side.

The center tunnel portion 328 is located behind inner cover 327. The center tunnel portion 328 has a tunnel shape that protrudes upward from the step floor 322 at the central portion in the vehicle width direction. The center tunnel portion 328 is a tunnel-shaped cover that extends in the front-rear direction, and has components, such as a fuel tank, disposed in the center tunnel portion 328.

The rider R places his or her feet on the step floor 322, respectively on the left and right sides over the center tunnel portion 328.

The airbag device 40 is attached to the rear surface portion of the inner cover 327 in front of the seat 317 and above the center tunnel portion 328. Note that the airbag device 40 may be attached to a stem 325 that supports the handle 323 on the front surface side of the inner cover 327.

The airbag device 40 is disposed at the center in the vehicle width direction. The airbag device 40 is provided at a position overlapping the head pipe 318 from behind in FIG. 11, but the airbag device 40 may be disposed at a position higher than the head pipe 318.

Specifically, an airbag storage portion 327a that stores the airbag device 40 is provided above the center tunnel portion 328 and at the upper part of the rear surface of the inner cover 327. Note that the airbag storage portion 327a may be provided behind the stem 325 on the front surface side of the inner cover 327.

The airbag 42 is deployed toward the rider R from the airbag storage portion 327a.

In the third embodiment, the airbag device 40 is disposed at a position farther from the rider R than in the structure of the above embodiment (first embodiment). For this reason, the airbag device 40 may be changed in the length or the like so as to be allowed to be properly in close contact with the rider R sitting on the seat 317.

Furthermore, instead of the airbag 42, the airbag 242 of the second embodiment, an airbag 542 of the fifth embodiment, and an airbag 642 of the sixth embodiment may be disposed in the airbag storage portion 327a.

Note that the airbag 42 may be stored in the front part of the seat 17 instead of in the airbag storage portion 327a.

Figure 12:
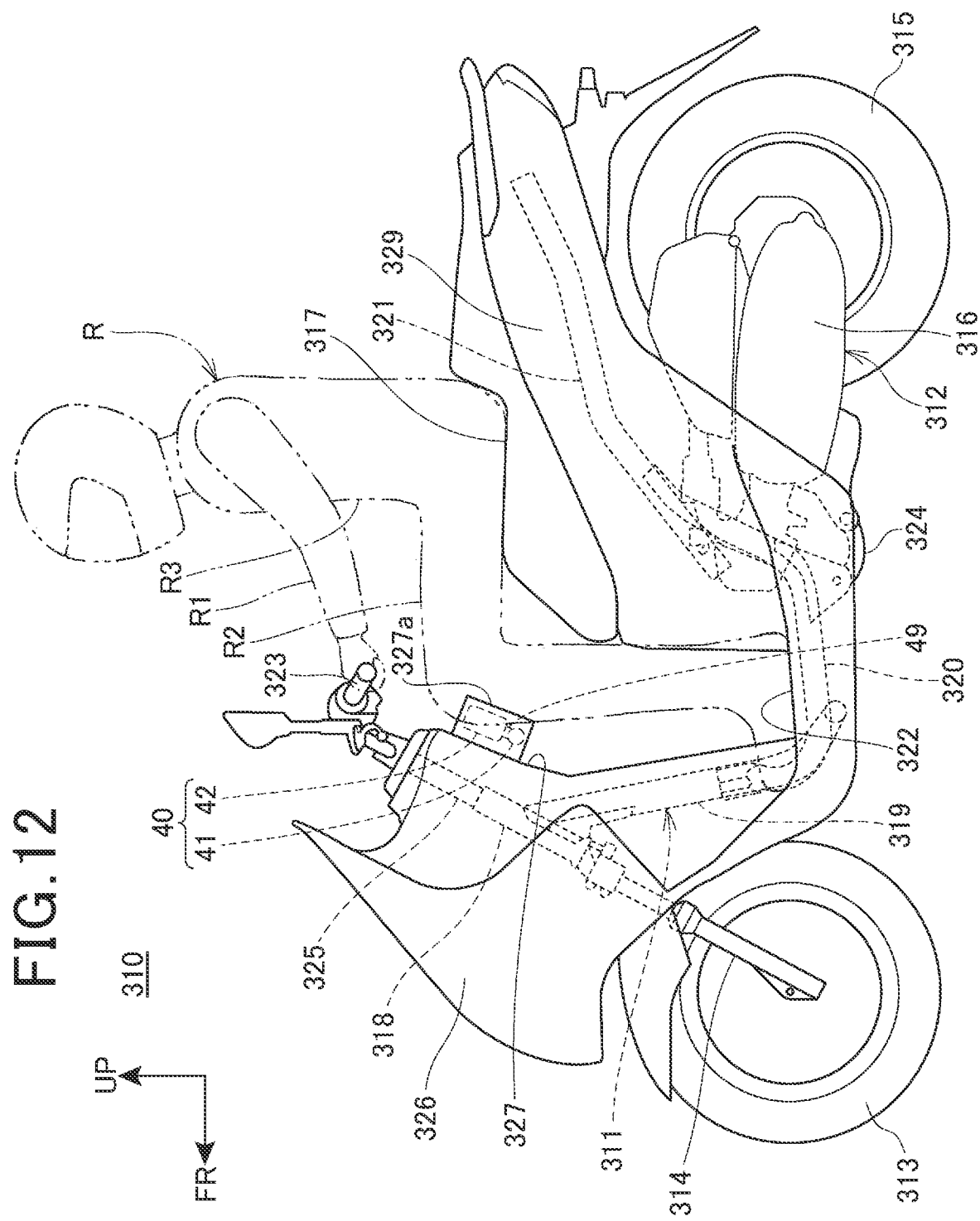
FIG. 12 is a left side view showing a modification of the third embodiment.

FIG. 12 is a left side view showing a modification of the third embodiment.

As shown in FIG. 12, the saddled vehicle 310 may have the step floor 322 formed as a substantially flat surface spanning the center in the vehicle width direction without including the center tunnel portion 328. In this case as well, the airbag 42 is attached to the upper part of the rear surface portion of the inner cover 327 in front of the seat 317.

Fourth Embodiment

A fourth embodiment to which the present invention is applied will be described below with reference to FIG. 13. In the fourth embodiment, the same reference signs are given to the portions configured similarly to the portions in the above embodiment (first embodiment), and the description of the portions will be omitted.

The fourth embodiment differs from the above embodiments in that the airbag device 40 is mounted on a stand-up vehicle 410.

Figure 13:
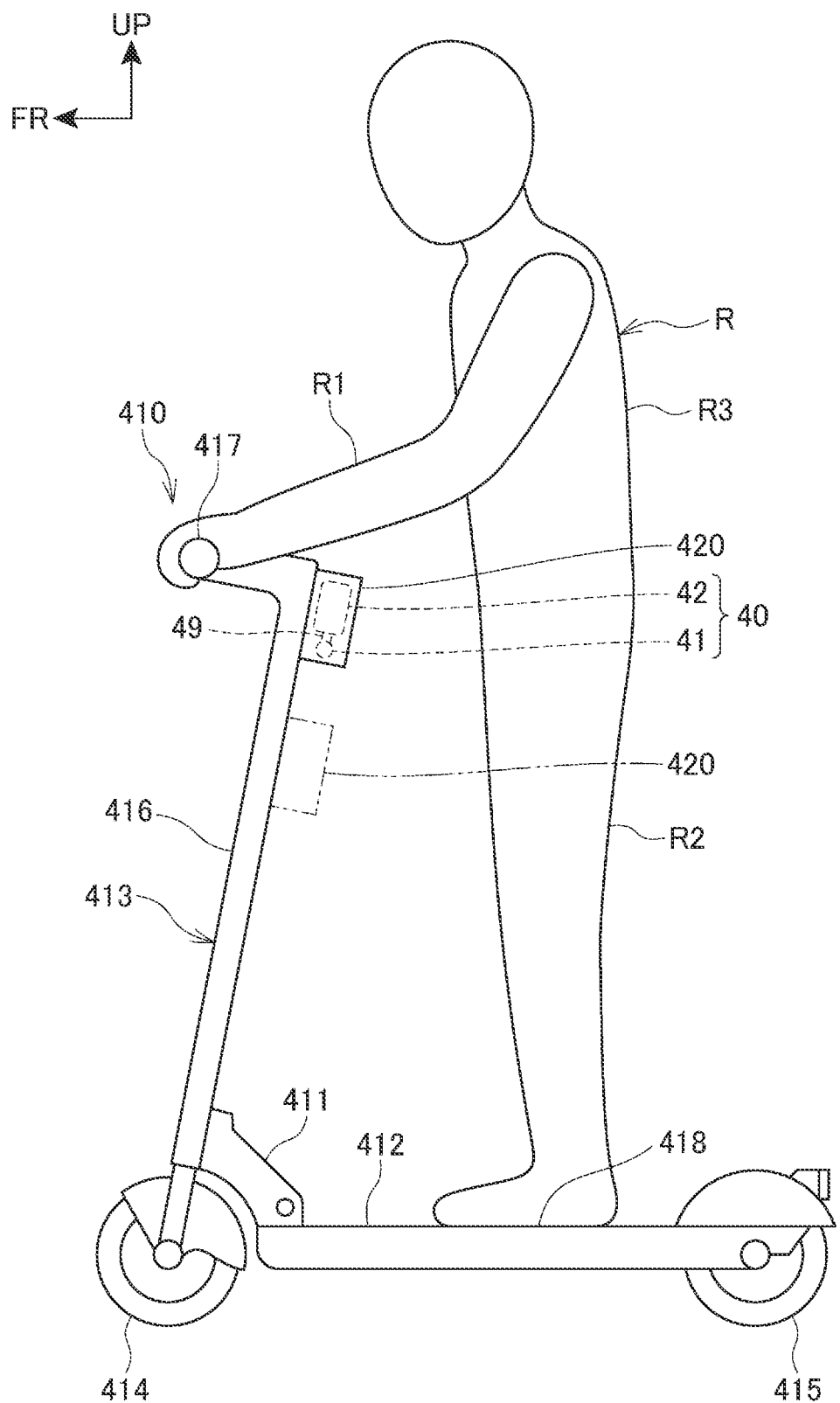
FIG. 13 is a left side view of a stand-up vehicle in a fourth embodiment.

FIG. 13 is a left side view of a stand-up vehicle 410 in the fourth embodiment.

The stand-up vehicle 410 is a vehicle including a vehicle body frame 411, a plate-shaped deck portion 412 on which a rider R rides, a steering portion 413 supported on the front end portion of the vehicle body frame 411 so as to be steerable left and right, a front wheel 414 supported on the lower end portion of the steering portion 413, and a rear wheel 415 provided at the rear end portion of the vehicle body. The deck portion 412 is supported on the vehicle body frame 411.

The steering portion 413 includes a steering shaft 416 supported on the front end portion of the vehicle body frame 411, and a handle 417 provided at the upper end portion of the steering shaft 416.

The rider R rides on the stand-up vehicle 410 by standing on the deck portion 412 behind the handle 417 and grasping the handle 417 with his or her hands.

The stand-up vehicle 410 is a so-called kickboard, and is a vehicle on which the rider R rides in a standing posture.

The riding position 418 of the rider R is located on the deck portion 412, behind the handle 417 and in front of the rear wheel 415.

A box-shaped airbag storage portion 420 is provided on the rear surface portion of the handle 417.

The airbag device 40 is stored in the airbag storage portion 420.

The airbag storage portion 420 and the airbag device 40 are provided in front of and above the riding position 418.

The airbag 42 is deployed rearward and upward from the airbag storage portion 420, and similarly to FIG. 2, the first deploying portion 35, the upwardly deploying portion 43, and the second deploying portion 50 come into close contact with the rider R so as to surround the rider R.

Note that, as shown by the imaginary line in FIG. 13, an airbag storage portion 420 may be provided on the rear surface of the steering shaft 416 below the handle 417, and this airbag storage portion 420 may store the airbag device 40.

Furthermore, instead of the airbag 42, the airbag 242 of the second embodiment, the airbag 542 of the fifth embodiment, and the airbag 642 of the sixth embodiment may be disposed in the airbag storage portion 420.

As described above, according to the fourth embodiment to which the present invention is applied, the vehicle includes the airbag 42 provided in front of the riding position 418 for the rider; the vehicle is a stand-up vehicle 410 in which the rider R stands to ride on the riding position 418; the airbag 42 includes a first deploying portion 35 that is deployed upward when deployed, an upwardly deploying portion 43 that is deployed upward from the first deploying portion 35 when deployed, and second deploying portions 50 that branch and extend from the first deploying portion 35 when deployed; and each second deploying portion 50 extends outward in the vehicle width direction from the first deploying portion 35.

This configuration causes the upwardly deploying portion 43 to be deployed upward from the first deploying portion 35 and the second deploying portions 50 to be extended outward in the vehicle width direction from the first deploying portion 35, allowing the airbag 42 to be compact and allowing the airbag 42 to be prevented from being obstructed by the arms R1 of the rider R to properly protect the rider R with the airbag 42.

Fifth Embodiment

A fifth embodiment to which the present invention is applied will be described below with reference to FIGS. 14 and 15. In the fifth embodiment, the same reference signs are given to the portions configured similarly to the portions in the above embodiment (first embodiment), and the description of the portions will be omitted.

The fifth embodiment differs from the above embodiments in that the airbag 542 includes intermediate portions 560.

Figure 14:
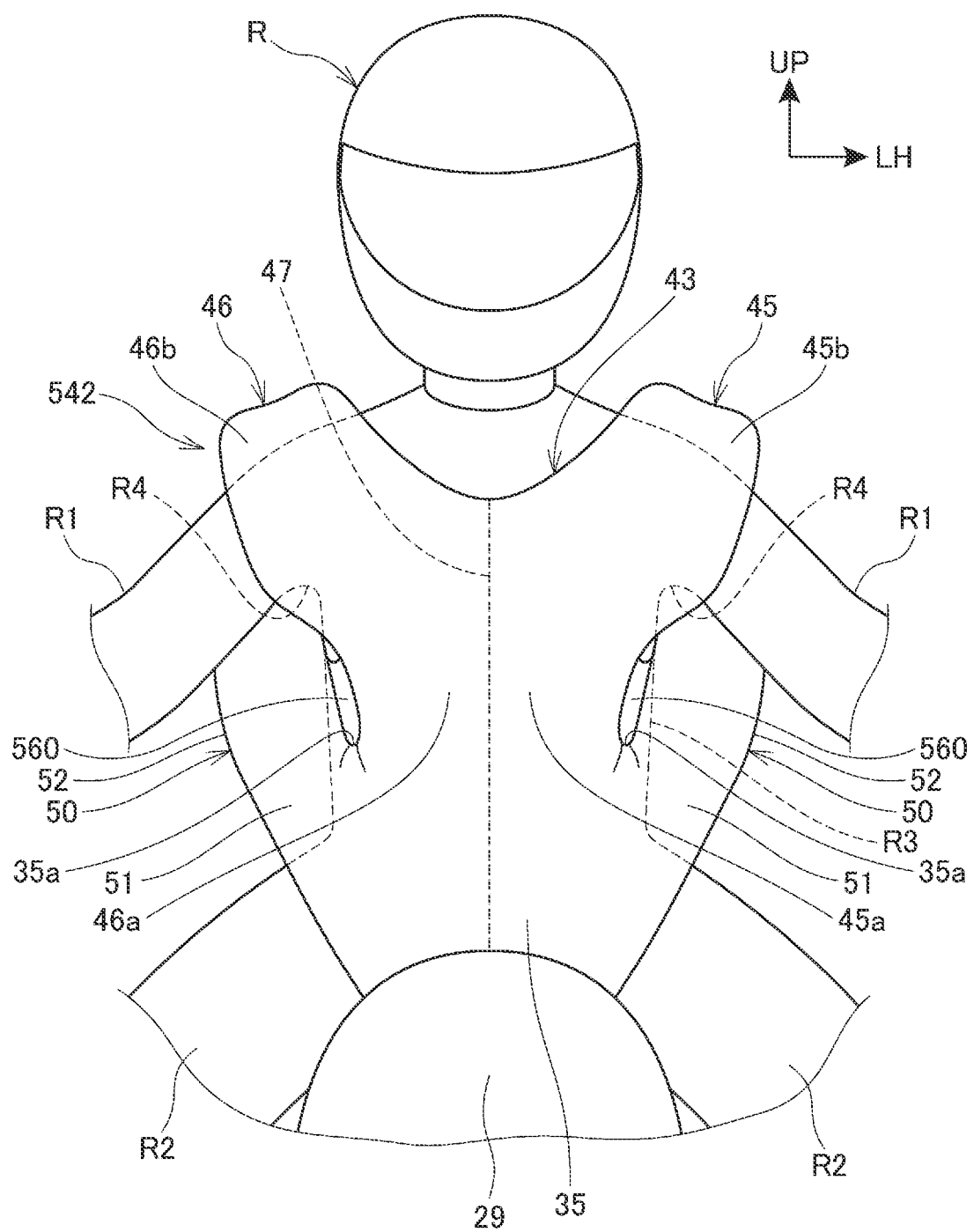
FIG. 14 is a front view of a state, seen from a front side, in which an airbag is deployed to protect a rider in a fifth embodiment.
Figure 15:
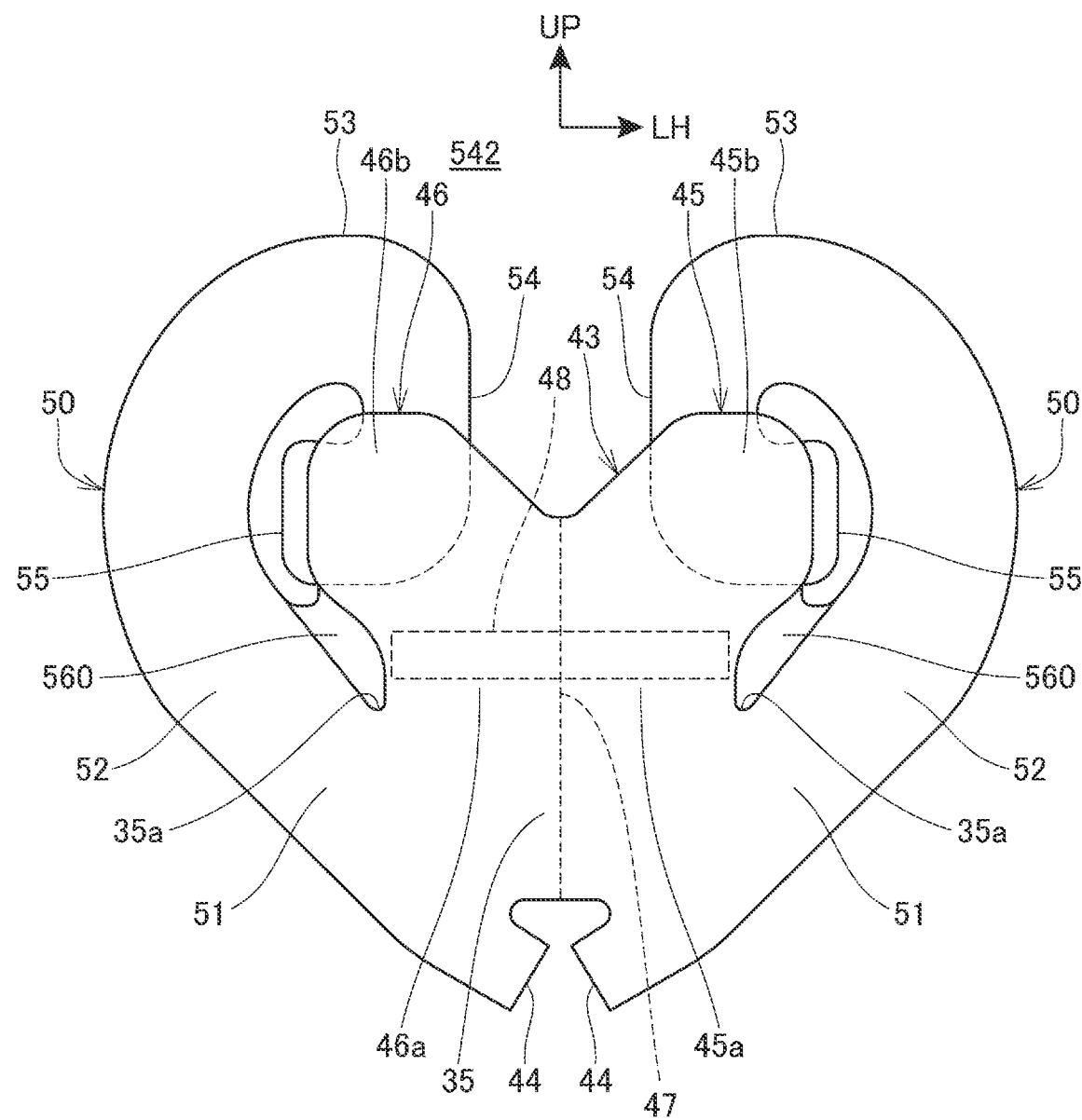
FIG. 15 is a front view of the deployed airbag seen from the front side.

FIG. 14 is a front view of a state, seen from the front side, in which an airbag 542 is deployed to protect the rider R in the fifth embodiment. FIG. 15 is a front view of the deployed airbag 542 seen from the front side.

The airbag 542 includes the first deploying portion 35, the upwardly deploying portion 43, the pair of left and right second deploying portions 50, and the inflator connecting portions 44.

Additionally, the airbag 542 includes a pair of left and right intermediate portions 560 that are respectively between the upwardly deploying portion 43 and each second deploying portion 50 and respectively connect the upwardly deploying portion 43 and each second deploying portion 50.

In detail, each intermediate portion 560 connects the upwardly deploying portion 43 and each laterally extending portion 51 of the second deploying portion 50. The intermediate portion 560 connects the upwardly deploying portion 43 and the lower end portion of the second deploying portion 50.

The airbag 542 is formed into a bag shape by sewing cloth. The first deploying portion 35, the upwardly deploying portion 43, and the second deploying portions 50 are air chambers formed inside the seam of the airbag 542. This seam is a sewing line formed along the periphery of the airbag 542. The intermediate portions 560 are cloth-like portions located outside the seam forming the air chambers, and do not allow gas from the inflator 41 to flow into the intermediate portions 560. Therefore, the intermediate portions 560 do not inflate when the airbag 542 is deployed, and remain flat and cloth-like even after the airbag 542 is deployed.

Note that the airbag 542 is not limited to the one formed by sewing cloth together. For example, the airbag 542 may be formed into a bag shape by bonding cloth or film, or may be formed into a bag shape as a woven fabric.

With the airbag 542 deployed, each intermediate portion 560 is located between the upwardly deploying portion 43 and the laterally extending portion 51, and is located below the armpit R4 of the rider R. The upward movement of the airbag 542 is restricted by the intermediate portions 560 in contact with the armpit R4 and the arm R1 from below. Therefore, the airbag 542 can be effectively wrapped around the rider R.

Since no gas flows into the intermediate portions 560, the airbag 542 can be quickly deployed even with the intermediate portion 560 provided.

The intermediate portion 560 is a portion formed by leaving the cloth portion uncut in adjusting the shape of the airbag 542 after sewing the airbag 542, so that the intermediate portion 560 can be easily formed.

As described above, according to the fifth embodiment to which the present invention is applied, the airbag 542 includes the intermediate portions 560 respectively between the upwardly deploying portion 43 and each second deploying portion 50, each intermediate portion 560 connects the upwardly deploying portion 43 and the second deploying portion 50, and the intermediate portions 560 are not inflated by the gas that deploys the airbag 542.

This configuration causes the intermediate portions 560 to be in contact with the rider R, allowing the airbag 542 to be positioned at an appropriate position relative to the rider R in inflation to properly protect the rider R. Adjusting sizes of the intermediate portions 560 allows for easily forming airbags with different specifications. Since no gas flows into the intermediate portions 560, the airbag 542 can be quickly deployed.

Note that each intermediate portion 560 may be provided between the upwardly deploying portion 43 and the rearwardly extending portion 52.

Furthermore, some gas from the inflator 41 may flow into the intermediate portions 560. In this case, each intermediate portion 560 inflates, but the inflation amount of the intermediate portion 560 is smaller than each of the inflation amount of the second deploying portion 50 and the inflation amount of the upwardly deploying portion 43.

Furthermore, each intermediate portion 560 may be provided between the upwardly deploying portion 43 and the second deploying portion 250 of the airbag 242 of the above-described second embodiment.

Furthermore, each of the above-described airbags of the third embodiment, the fourth embodiment, and the sixth embodiment may be provided with intermediate portions 560.

Sixth Embodiment

A sixth embodiment to which the present invention is applied will be described below with reference to FIGS. 16 to 18. In the sixth embodiment, the same reference signs are given to the portions configured similarly to the portions in the above embodiment (first embodiment), and the description of the portions will be omitted.

The sixth embodiment differs from the above embodiments in that second deploying portions 650 extend rearward from a first deploying portion 635.

Figure 16:
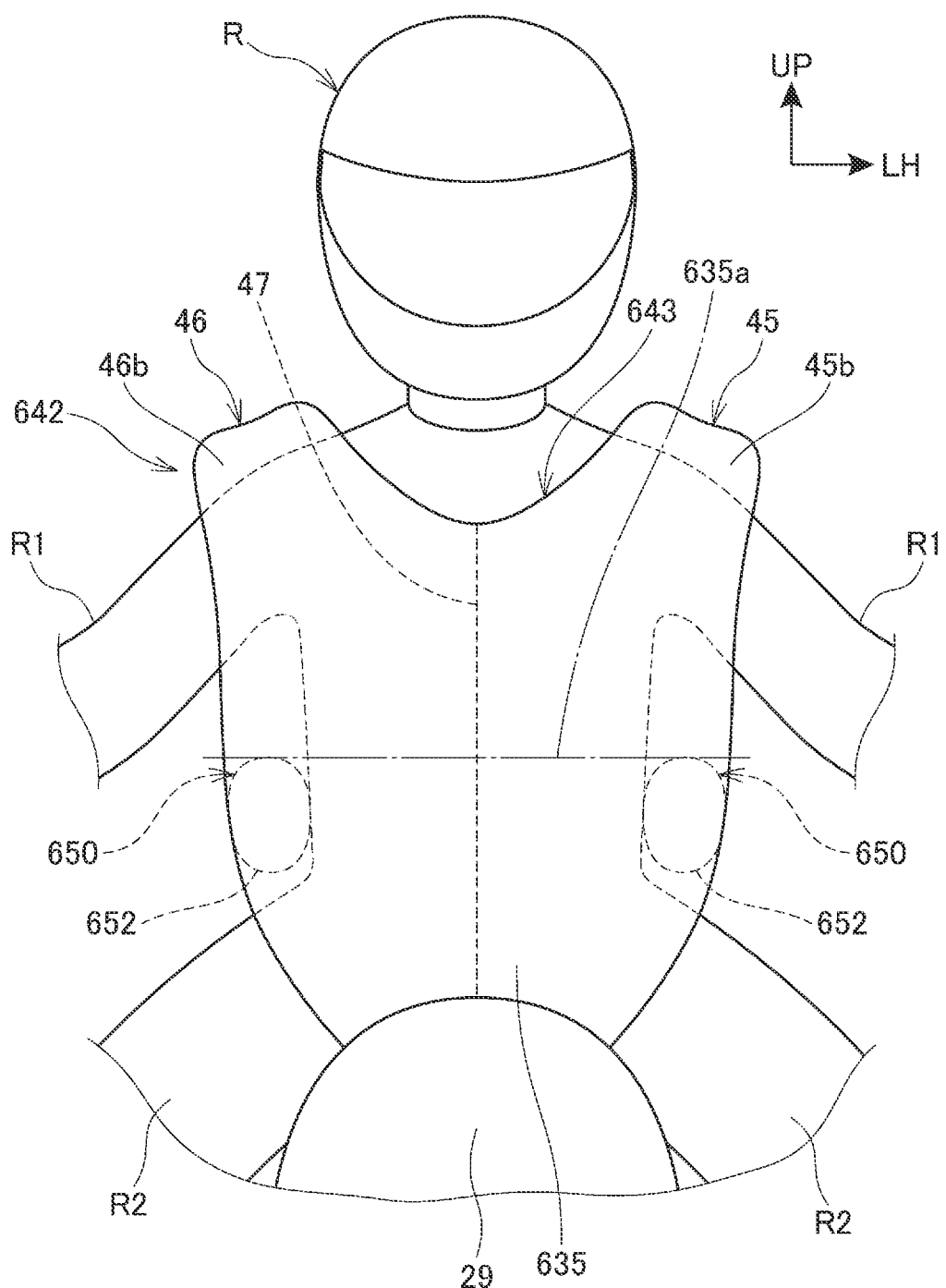
FIG. 16 is a front view of a state, seen from a front side, in which an airbag is deployed to protect a rider in a sixth embodiment.
Figure 17:
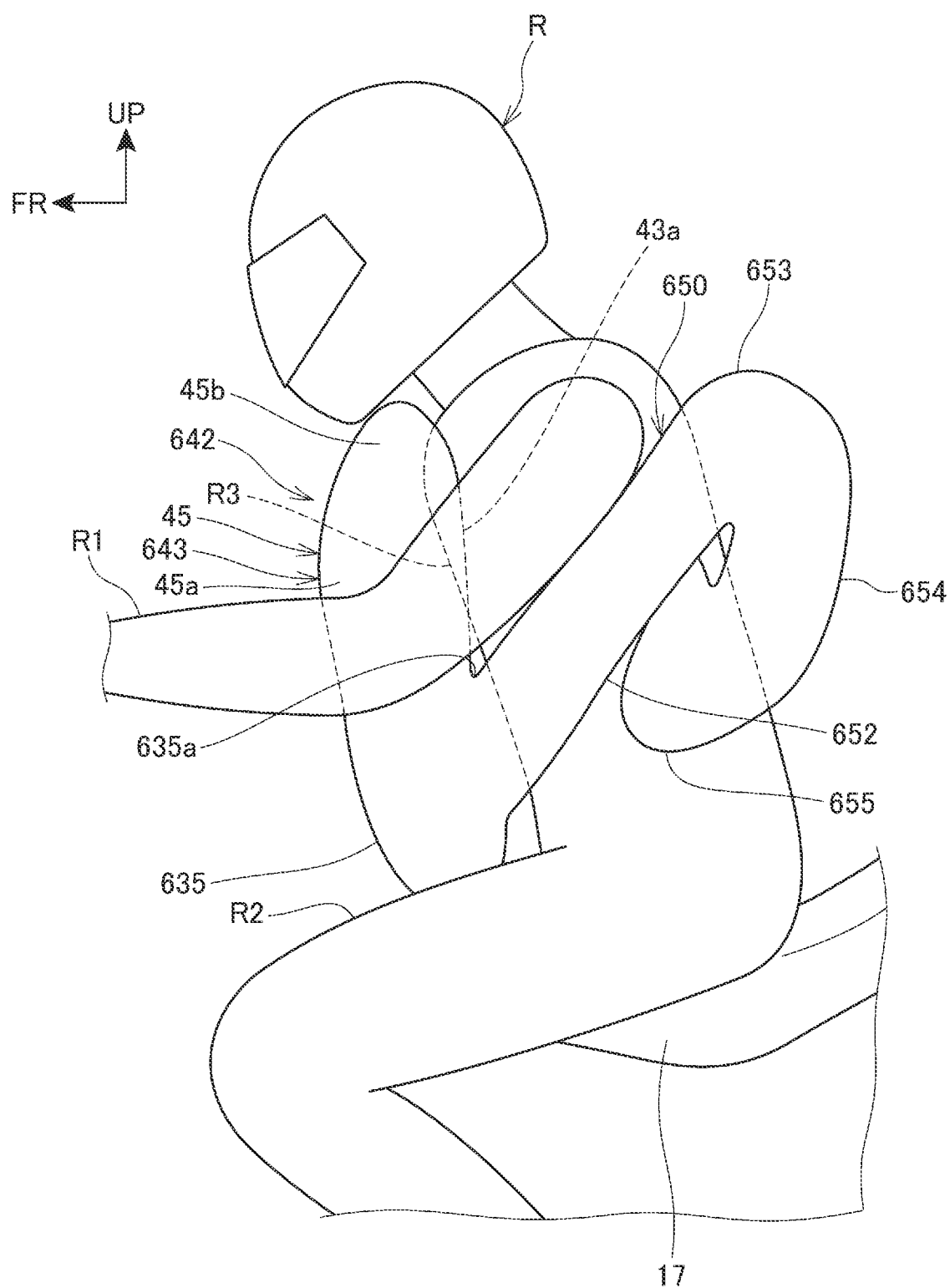
FIG. 17 is a left side view showing the state in which the airbag is deployed to protect the rider.

FIG. 16 is a front view of a state, seen from the front side, in which an airbag 642 is deployed to protect the rider R in the sixth embodiment. FIG. 17 is a left side view showing a state in which the airbag 642 is deployed to protect the rider R.

The airbag 642 is stored in the airbag storage portion 29a (FIG. 1). The airbag 642 is connected to the inflators 41 via separating mechanism 49.

The airbag 642 includes a first deploying portion 635, an upwardly deploying portion 643, a pair of left and right second deploying portions 650 that branch from the first deploying portion 635 and extend rearward, and inflator connecting portions 44 (FIG. 5). The inflator connecting portions 44 are provided at the lower end portion of the first deploying portion 635.

The first deploying portion 635 has a larger width in the vehicle width direction than the first deploying portion 35 of the above embodiments, and has the same basic shape as the first deploying portion 35.

The width of the first deploying portion 635 in the vehicle width direction is larger than the width of the torso R3. Therefore, in a deployed state, each end portion of the first deploying portion 635 in the vehicle width direction is located on the outer side in the vehicle width direction relative to the torso R3.

The upwardly deploying portion 643 has a larger width in the vehicle width direction than the upwardly deploying portion 43 of the above embodiments, and has the same basic shape as the upwardly deploying portion 43. In other words, the upwardly deploying portion 643 has a width of the one-side upwardly deploying portion 45 and the other-side upwardly deploying portion 46 that are larger than the above embodiments.

The width of the upwardly deploying portion 643 in the vehicle width direction is larger than the width of the torso R3. Therefore, in a deployed state, each end portion of the upwardly deploying portion 643 in the vehicle width direction is located on the outer side in the vehicle width direction relative to the torso R3.

A connecting member 48 (FIG. 6) is provided on the rear surface 43a of the upwardly deploying portion 643.

Each second deploying portion 650 has a rod shape that extends from the rear surface of the first deploying portion 635 toward the rear side of the vehicle. The second deploying portion 650 has a rod shape that is thinner than the upwardly deploying portion 643.

The proximal end portion of the second deploying portion 650 communicates with the inside of the first deploying portion 635.

Specifically, each second deploying portion 650 includes a second rearwardly extending portion 652 that extends rearward from the outer end portion in the vehicle width direction on the rear surface of the first deploying portion 635, an inner bending portion 653 that bends inward in the vehicle width direction from the rear end portion of the second rearwardly extending portion 652; a downwardly extending portion 654 that bends from the inner bending portion 653 and extends downward, and a folded-back portion 655 that is folded back from the lower end portion of the downwardly extending portion 654 toward the second rearwardly extending portion 652 in the front.

Here, the inner bending portion 653, the downwardly extending portion 654, and the folded-back portion 655 have the same shapes as the inner bending portion 53, the downwardly extending portion 54, and the folded-back portion 55 of the above embodiment, respectively, and detailed description will be omitted.

Each second rearwardly extending portion 652 extends rearward from the lower part of a deploying portion formed by the first deploying portion 635 and the upwardly deploying portion 643.

In the front view of FIG. 16, the upper end 635a of the first deploying portion 635 is located at the upper end of the connecting portion between the first deploying portion 635 and each second rearwardly extending portion 652.

Each second rearwardly extending portion 652 extends rearward toward the rear side of the seat 17 from the outer end portion in the vehicle width direction on the rear surface of the first deploying portion 635. The second rearwardly extending portion 652 extends almost directly behind the first deploying portion 635.

The second rearwardly extending portion 652 has a rod shape that extends diagonally rearward and upward from the first deploying portion 635 in a vehicle side view, and is thinner than the upwardly deploying portion 643.

The second rearwardly extending portion 652 extends from the first deploying portion 635 to the rear side of the rider R along the outer side surface of the torso R3, through between: the arm R1 of the rider R sitting on the seat 17 and grasping the handle 21; and the leg R2 of the Each second rearwardly extending portion 652 forms a section from the first deploying portion 635 to the inner bending portion 653. The second rearwardly extending portion 652 extends rearward along each outer side surface of the torso R3.

The inner bending portion 653 is provided at the end portion in the extending direction of the second rearwardly extending portion 652. The inner bending portion 653 is located behind and above the first deploying portion 635. The inner bending portions 653 turn to the rear surface side of the torso R3 and are in contact with the back of the rider R.

Each downwardly extending portion 654 extends downward from the inner end portion in the vehicle width direction of the inner bending portion 653, along the back of the rider R.

Each folded-back portion 655 extends toward the second rearwardly extending portion 652, which extends rearward and upward in front of the folded-back portion 655, and is in contact with the second rearwardly extending portion 652 from behind.

With the airbag 642 deployed, the airbag 642 surrounds the rider R and is in close contact with the Specifically, the first deploying portion 635 and the upwardly deploying portion 643 are in contact with the torso R3 from the front side to protect the torso R3.

The left and right second rearwardly extending portions 652 are located below the arms R1. Each second rearwardly extending portion 652 extends rearward through between the arm R1 and the leg R2, and covers the lower part of the torso R3 from the outer side in the vehicle width direction. This prevents the arm R1 from obstructing the second deploying portion 650 when the second deploying portion 650 is deployed rearward.

Each second rearwardly extending portion 652 is in contact with the outer side surface of the torso R3 below the arm R1 to protect the torso R3. The second rearwardly extending portion 652 extends rearward and upward along the arm R1.

Each inner bending portion 653 and the downwardly extending portion 654 are in contact with the back of the rider R to protect the back.

Each folded-back portion 655 is in contact with the outer side surface of the torso R3 below the second rearwardly extending portion 652 to protect the torso R3. Furthermore, the folded-back portion 655 is in contact with the second rearwardly extending portion 652 from behind to suppress deformation of the overall shape of the second deploying portion 650 and maintain the second deploying portion 650 in an appropriate shape.

Since the airbag 642 has the second deploying portions 650 that pass below the arms R1, the second deploying portions 650 are unlikely to get in the way of the arms R1 and the airbag 642 is properly in close contact with the rider R via the upwardly deploying portion 643 and the second deploying portions 650. Additionally, the airbag 642 has the second rearwardly extending portions 652 each sandwiched between the arm R1 and the leg R2 to be properly in close contact with the rider R.

The airbag 642 sandwiches the rider R in the vehicle front-rear direction between: the first deploying portion 635 and the upwardly deploying portion 643; and the inner bending portions 653 and downwardly extending portions 654 of the second deploying portions 650. Additionally, the airbag 642 sandwiches the rider R in the left-right direction between the left and right second rearwardly extending portions 652 and the left and right folded-back portions 655. Therefore, the airbag 642 is properly in close contact with the rider R.

At least part of each inner bending portion 653 overlaps the upwardly deploying portion 643 in the vehicle front-rear direction. In other words, in the front view shown in FIG. 16, the upwardly deploying portion 643 overlaps at least part of each inner bending portion 653 from the front side. This allows the inner bending portions 653 and the upwardly deploying portion 643 to sandwich the rider R between the front and the rear, allowing the airbag 642 to be effectively in close contact with the rider R.

Each second deploying portion 650 is rod-shaped and has a small volume, resulting in quick deployment.

With the airbag 642 deployed, the length of each second deploying portion 650 in the deploying direction is longer than the length that is the sum of lengths of the first deploying portion 635 and the upwardly deploying portion 643 in the deploying direction.

As described above, according to the sixth embodiment to which the present invention is applied, the airbag 642 includes a first deploying portion 635 that is deployed upward when deployed, an upwardly deploying portion 643 that is deployed upward from the first deploying portion 635 when deployed, and second deploying portions 650 that branch and extend from the first deploying portion 635 when deployed; and the second deploying portions 650 extend rearward from the first deploying portion 635.

This configuration causes the upwardly deploying portion 643 to be deployed upward from the first deploying portion 635 and causes the second deploying portions 650 to extend rearward from the first deploying portion 635, allowing the airbag 642 to be compact and allowing the airbag 642 to be prevented from being obstructed by the arms R1 of the rider R to properly protect the rider R with the airbag 642.

Figure 18:
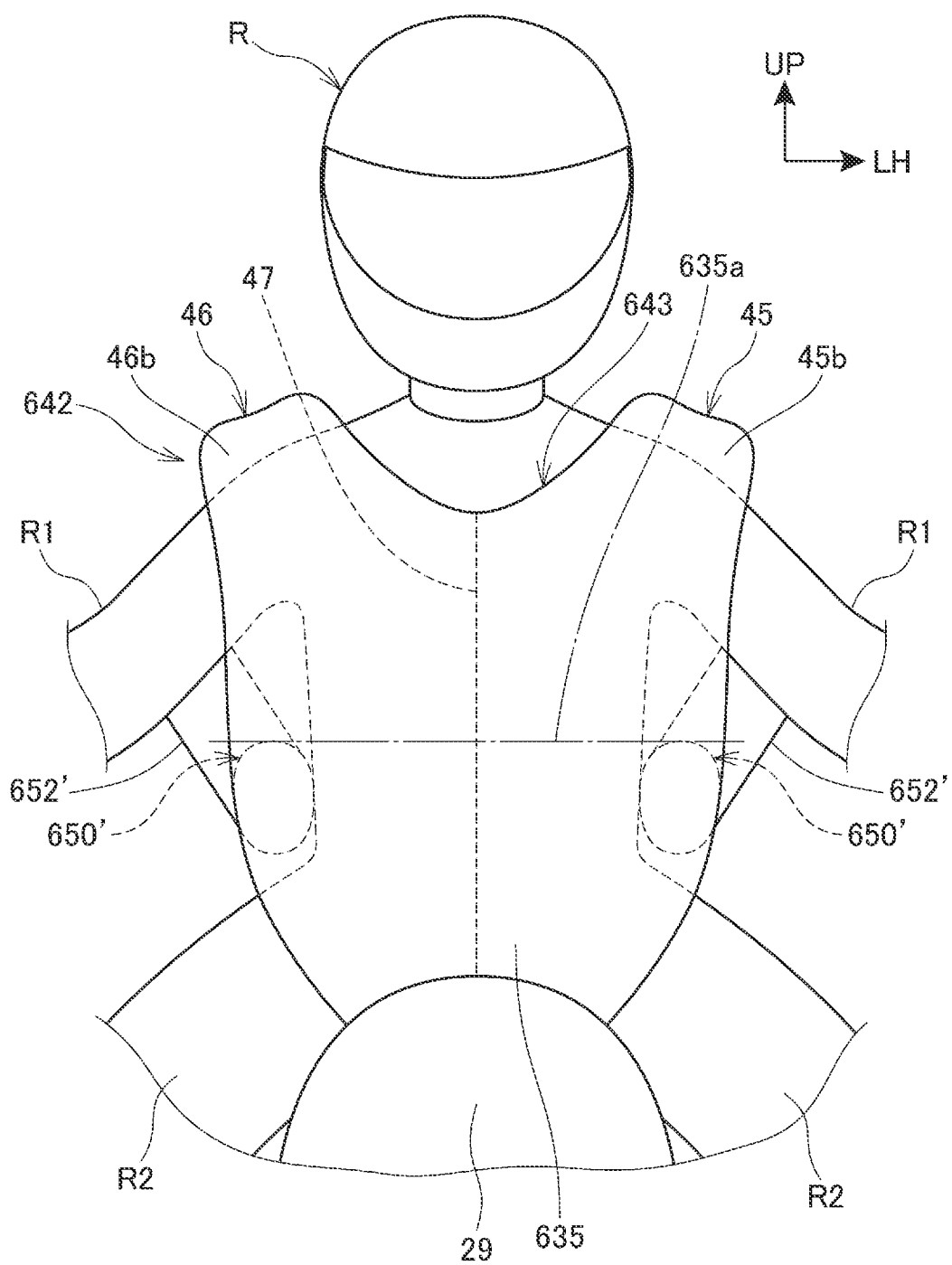
FIG. 18 is a front view of a state, seen from a front side, in which an airbag is deployed to protect a rider in a modification of the sixth embodiment.

FIG. 18 is a front view of a state, seen from the front side, in which the airbag 642 is deployed to protect the rider R in a modification of the sixth embodiment.

In the sixth embodiment, the second deploying portions 650 extends rearward from the rear surface of the first deploying portion 635, but the second deploying portions 650 may extend rearward and outward from the rear surface of the first deploying portion 635.

In this modification, the second deploying portions 650 are referred to as second deploying portions 650' for distinction.

The second rearwardly extending portions 652' of the second deploying portions 650' extend rearward and outward from the rear surface of the first deploying portion 635. Each second rearwardly extending portion 652' inclines to be progressively located outward in the vehicle width direction as the second rearwardly extending portion 652' extends rearward, from the first deploying portion 635 to the inner bending portion 653. Each folded-back portion 655 is folded back forward, toward the second rearwardly extending portion 652'.

Seventh Embodiment

A seventh embodiment to which the present invention is applied will be described below with reference to FIGS. 19 and 20. In the seventh embodiment, the same reference signs are given to the portions configured similarly to the portions in the above embodiment (first embodiment), and the description of the portions will be omitted.

The seventh embodiment differs from the above embodiments in that the airbag 42 is provided in rider equipment 771 worn by the rider R.

Figure 19:
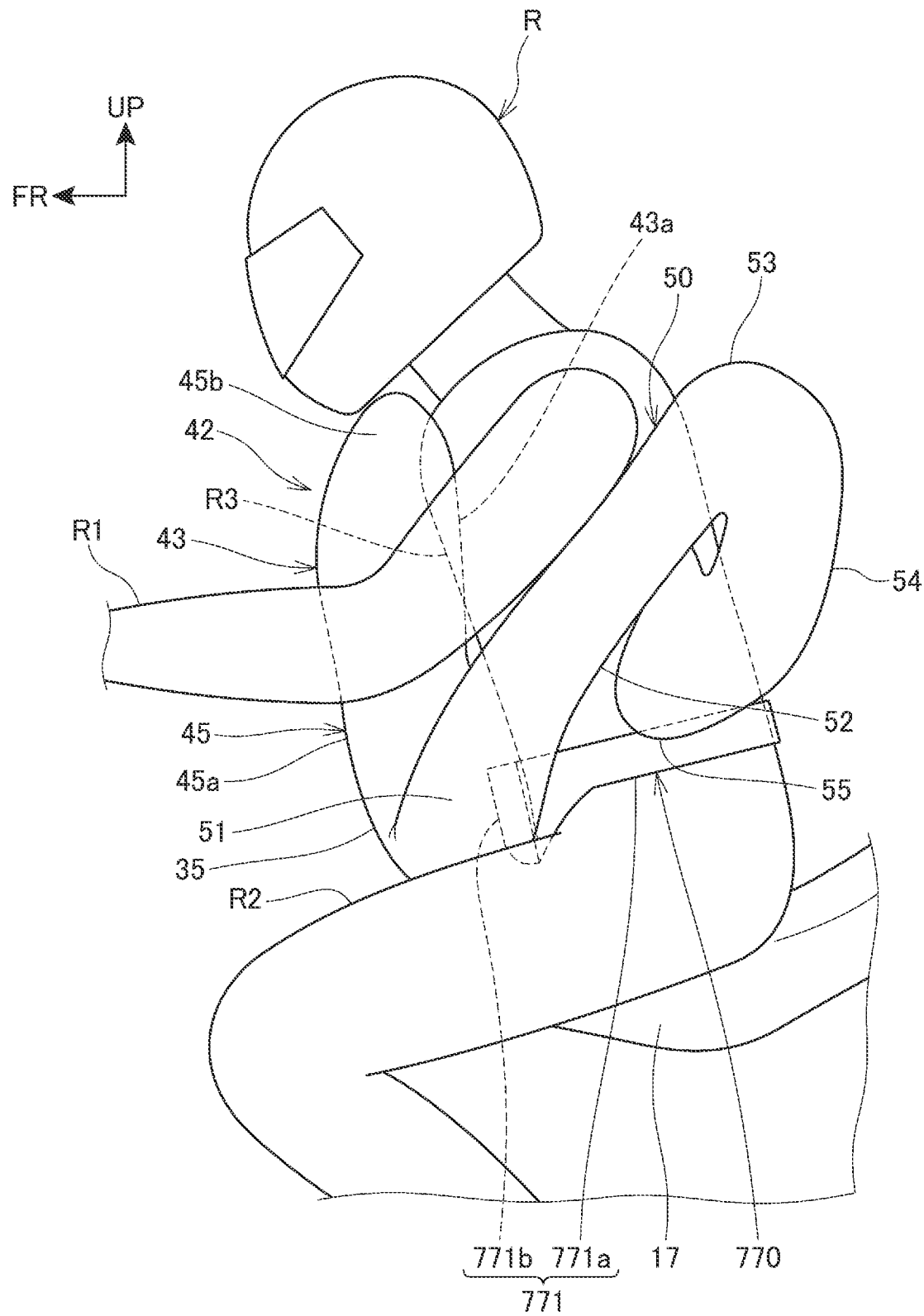
FIG. 19 is a left side view showing a state in which an airbag is deployed to protect a rider in a seventh embodiment.

FIG. 19 is a left side view showing a state in which the airbag 42 is deployed to protect the rider R in the seventh embodiment. FIG. 20 is a front view of a state, seen from the front side, in which the airbag 42 is deployed to protect the rider R.

The rider protector 770 includes rider equipment 771 worn by the rider R, and an airbag 42 supported by the rider equipment 771.

The rider equipment 771 is a belt that is detachably attached to the lower part of the torso R3.

The rider equipment 771 includes a belt-shaped belt portion 771a that wraps around the outer periphery of the torso R3, and a case-shaped airbag storage portion 771b provided on the front surface of the belt portion 771a. The airbag storage portion 771b is located in front of the lower part of the torso R3.

The airbag 42 is stored in the airbag storage portion 771b in a folded state. Furthermore, the inflator 41 (FIG. 1) is also stored in the airbag storage portion 771b. The airbag 42 is located in front of the lower part of the torso R3.

The airbag 42 is deployed upward and rearward from the airbag storage portion 771b.

With the airbag 42 deployed, the airbag 42 surrounds the rider R and is in close contact with the rider R.

Figure 20:
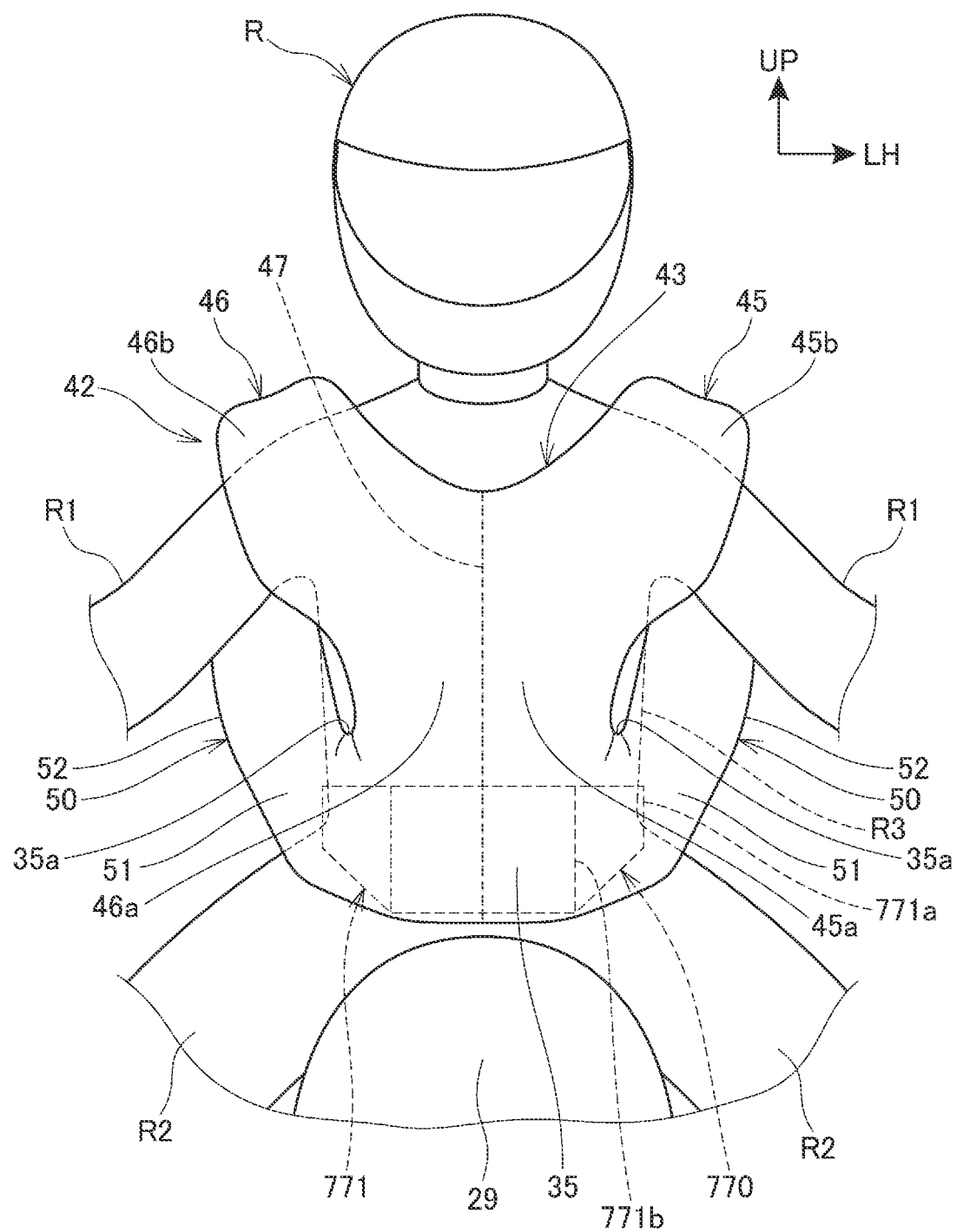
FIG. 20 is a front view of the state, seen from a front side, in which the airbag is deployed to protect the rider.

The deployed state of the airbag 42 of the rider equipment 771 shown in FIGS. 19 and 20 is the same as that in the above embodiment (see FIGS. 2 to 4), so a detailed description will be omitted here.

As described above, according to the seventh embodiment to which the present invention is applied, the rider protector 770 includes the rider equipment 771 worn by the rider R that rides on the saddled vehicle 10, and the airbag 42; the airbag 42 is supported by the rider equipment 771 and is located on the front surface side of the torso R3 of the rider R; the airbag 42 includes a first deploying portion 35 that is deployed upward when deployed, an upwardly deploying portion 43 that is deployed upward from the first deploying portion 35 when deployed, and second deploying portions 50 that branch and extend from the first deploying portion 35 when deployed; and each second deploying portion 50 extends outward in the vehicle width direction from the first deploying portion 35.

This configuration causes the upwardly deploying portion 43 to be deployed upward from the first deploying portion 35 and the second deploying portions 50 to be extended outward in the vehicle width direction from the first deploying portion 35, allowing the airbag 42 to be compact and allowing the airbag 42 to be prevented from being obstructed by the arms R1 of the rider R to properly protect the rider R with the airbag 42. Furthermore, the airbag 42 is stored in the airbag storage portion 771b when not operated, and is deployed when protecting the rider R. Therefore, air permeability is better than, for example, an airbag that is constantly worn by the rider R in a deployed state.

Note that in the seventh embodiment, the second deploying portions 50 may extend rearward from the rear surface of the first deploying portion 635, like the second deploying portion 650 in FIG. 16. Furthermore, the second deploying portions 50 may extend rearward and outward from the rear surface of the first deploying portion 635, like the second deploying portion 650 in FIG. 18.

Furthermore, instead of the airbag 42, any one of the airbags 242, 542, and 642 may be provided in the airbag storage portion 771b.

Eighth Embodiment

An eighth embodiment to which the present invention is applied will be described below with reference to FIG. 21. In the eighth embodiment, the same reference signs are given to the portions configured similarly to the portions in the above embodiment (first embodiment), and the description of the portions will be omitted.

The eighth embodiment differs from the above embodiments in that the airbag 42 is provided in rider equipment 871 worn by the rider R.

Figure 21:
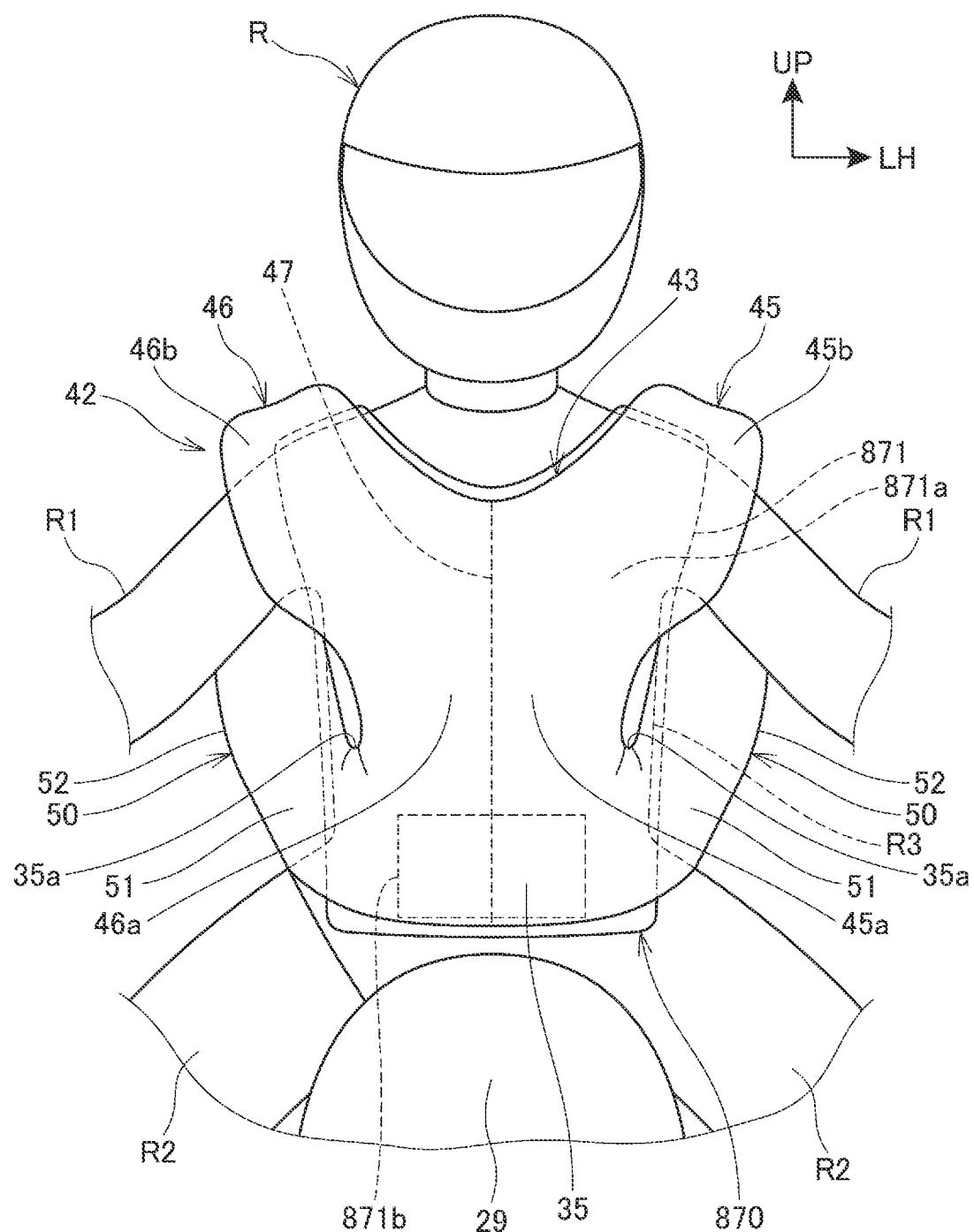
FIG. 21 is a front view of a state, seen from a front side, in which an airbag is deployed to protect a rider in an eighth embodiment.

FIG. 21 is a front view of a state, seen from the front side, in which an airbag 42 is deployed to protect the rider R in the eighth embodiment.

The rider protector 870 includes rider equipment 871 worn by the rider R, and an airbag 42 supported by the rider equipment 871.

The rider equipment 871 is a jacket that is detachably attached to the torso R3. This jacket is, for example, a vest type jacket.

The rider equipment 871 includes a case-shaped airbag storage portion 871b at the lower part of a jacket front surface portion 871a that covers the torso R3 from the front side. The airbag storage portion 871b is located in front of the lower part of the torso R3.

The airbag 42 is stored in the airbag storage portion 871b in a folded state. Furthermore, the inflator 41 (FIG. 1) is also stored in the airbag storage portion 871b. The airbag 42 is located in front of the lower part of the torso R3.

Note that the airbag storage portion 871b may be a pocket provided in the jacket for the airbag 42. Furthermore, the airbag storage portion 871b may be a fastener such as a button or a zipper that allows the airbag 42 to be attached to the jacket.

The airbag 42 is deployed upward and rearward from the airbag storage portion 871b.

With the airbag 42 deployed, the airbag 42 surrounds the rider R and is in close contact with the rider R.

The deployed state of the airbag 42 of the rider equipment 871 shown in FIG. 21 is the same as that in the above embodiment (see FIGS. 2 to 4), so detailed description will be omitted here.

As described above, according to the eighth embodiment to which the present invention is applied, the rider protector 870 includes the rider equipment 871 worn by the rider R that rides on the saddled vehicle 10, and the airbag 42; the airbag 42 is supported by the rider equipment 871 and is located on the front surface side of the torso R3 of the rider R; and the airbag 42 includes a first deploying portion 35 that is deployed upward when deployed, an upwardly deploying portion 43 that is deployed upward from the first deploying portion 35 when deployed, and second deploying portions 50 that branch and extend from the first deploying portion 35 when deployed. Each second deploying portion 50 extends outward in the vehicle width direction from the first deploying portion 35.

This configuration causes the upwardly deploying portion 43 to be deployed upward from the first deploying portion 35 and the second deploying portions 50 to be extended outward in the vehicle width direction from the first deploying portion 35, allowing the airbag 42 to be compact and allowing the airbag 42 to be prevented from being obstructed by the arms R1 of the rider R to properly protect the rider R with the airbag 42. Furthermore, the airbag 42 is stored in the airbag storage portion 871b when not operated, and is deployed when protecting the rider R. Therefore, air permeability is better than, for example, an airbag that is constantly worn by the rider R in a deployed state.

Note that in the eighth embodiment, the second deploying portions 50 may extend rearward from the rear surface of the first deploying portion 635, like the second deploying portions 650 in FIG. 16. Furthermore, the second deploying portions 50 may extend rearward and outward from the rear surface of the first deploying portion 635, like the second deploying portion 650 in FIG. 18.

Furthermore, instead of the airbag 42, any one of the airbags 242, 542, and 642 may be provided in the airbag storage portion 871b.

Configurations Supported by Above Embodiments

The above embodiments support the following configurations.

Configuration 1

A saddled vehicle including: a seat for a rider; and an airbag provided in front of the seat or in a front part of the seat, in which the airbag includes a first deploying portion that is deployed upward when deployed, an upwardly deploying portion that is deployed upward from the first deploying portion when deployed, and a second deploying portion that branches and extends from the first deploying portion when deployed, and the second deploying portion extends outward in a vehicle width direction, rearward, or rearward and outward in the vehicle width direction, from the first deploying portion.

This configuration causes the upwardly deploying portion to extend upward from the first deploying portion and causes the second deploying portion to extend outward in the vehicle width direction, rearward, or rearward and outward in the vehicle width direction, from the first deploying portion, allowing the airbag to be compact and allowing the airbag to be prevented from being obstructed by the arms of the rider to properly protect the rider with the airbag.

Configuration 2

The saddled vehicle according to Configuration 1, in which the second deploying portion includes a laterally extending portion that extends outward in a vehicle width direction from the first deploying portion; a rearwardly extending portion that extends rearward from the laterally extending portion.

This configuration allows the airbag to be effectively in close contact with the rider via the laterally extending portion and the rearwardly extending portion, and allows the rearwardly extending portion to protect the lateral sides of the rider.

Configuration 3

The saddled vehicle according to Configuration 1, in which the second deploying portion includes a second rearwardly extending portion that extends rearward or posterolaterally from the first deploying portion.

This configuration allows the airbag to be effectively in close contact with the rider via the second rearwardly extending portion, and allows the second rearwardly extending portion to protect the lateral sides of the rider.

Configuration 4

The saddled vehicle according to Configuration 2 or 3, in which the second deploying portion includes an inner bending portion that bends inward in the vehicle width direction from at least any one of the rearwardly extending portion and the second rearwardly extending portion, and at least part of the inner bending portion overlaps the upwardly deploying portion in a vehicle front-rear direction.

This configuration allows the inner bending portion to protect the rider from behind, and allows the inner bending portion and the upwardly deploying portion to effectively bring the airbag into close contact with the rider so as to sandwich the rider between the front and the rear.

Configuration 5

The saddled vehicle according to Configuration 4, in which each of the rearwardly extending portion and the second rearwardly extending portion extends to be progressively located toward an outer side in the vehicle width direction as the rearwardly extending portion and the second rearwardly extending portion extend rearward until reaching the inner bending portion.

This configuration allows the rearwardly extending portion and the second rearwardly extending portion to be properly deployed rearward along the rider.

Configuration 6

The saddled vehicle according to Configuration 4 or 5, in which the second deploying portion includes a downwardly extending portion that bends from the inner bending portion and extends downward.

This configuration allows the inner bending portion and the downwardly extending portion to protect the rider from behind over a large area. Furthermore, the downwardly extending portion allow the airbag to be effectively in close contact with the rider.

Configuration 7

The saddled vehicle according to Configuration 6, in which the rearwardly extending portion and the second rearwardly extending portion extend diagonally rearward and upward in a vehicle side view.

This configuration causes the positions of the rearwardly extending portion and the inner bending portion extending from the second rearwardly extending portion to be higher, allowing the inner bending portion and the downwardly extending portion to be provided in a large area in the up-down direction, and allowing the inner bending portion and the downwardly extending portion to effectively protect the rider. Furthermore, the high position of the rider can be protected, facilitating protection of the area of the head and neck.

Configuration 8

The saddled vehicle according to Configuration 6 or 7, in which the second deploying portion includes a folded-back portion that is folded back from the downwardly extending portion toward the rearwardly extending portion or the second rearwardly extending portion.

This configuration allows the folded-back portion to protect the rider. Furthermore, the folded-back portion is in contact with the rearwardly extending portion or the second rearwardly extending portion, allowing for easily maintaining the second deploying portion in an appropriate shape.

Configuration 9

The saddled vehicle according to any of Configurations 1 to 8, in which with the airbag deployed, a length of the second deploying portion in a deploying direction is longer than a length that is a sum of lengths of the first deploying portion and the upwardly deploying portion in a deploying direction.

This configuration causes the second deploying portion to have a long length in the deploying direction, allowing the second deploying portion to effectively hold the rider. Furthermore, the first deploying portion and the upwardly deploying portion are short, allowing the first deploying portion and the upwardly deploying portion to be deployed quickly.

Configuration 10

The saddled vehicle according to Configuration 1, in which the second deploying portion includes an extending portion that extends outward in the vehicle width direction, rearward, or posterolaterally in the vehicle width direction, from the first deploying portion, and a second upwardly extending portion that extends upward from the extending portion to at least a position of the upwardly deploying portion.

This configuration allows the second upwardly extending portion to protect the rider, and allows the upwardly deploying portion, the extending portion, and the second upwardly extending portion to properly bring the airbag into close contact with the rider so as to sandwich the rider.

Configuration 11

The saddled vehicle according to Configuration 10, in which the second upwardly extending portion extends higher than an upper surface of the upwardly deploying portion.

This configuration allows the second upwardly extending portion to properly protect the high position of the rider.

Configuration 12

The saddled vehicle according to any of Configurations 1 to 11, in which the upwardly deploying portion is deployed upward along a front surface of a torso of a rider sitting on the seat, and the second deploying portion extends through between an arm of the rider and a leg of the rider, the rider sitting on the seat and grasping a handle for steering.

This configuration allows the second deploying portion to be prevented from getting in the way of the arms, and allows the airbag to be properly in close contact with the rider via the second deploying portion sandwiched between the arm and the leg. The second deploying portion which has a size that can pass between the arm and the leg, is allowed to be compact.

Configuration 13

The saddled vehicle according to any of Configurations 1 to 12, in which the second deploying portion has a rod shape that extends from the first deploying portion, and has a rod shape that is thinner than the upwardly deploying portion.

This configuration has the second deploying portion having a rod shape, allowing the second deploying portion to have a smaller volume and allowing the second deploying portion to be effectively in close contact with the rider.

Configuration 14

The saddled vehicle according to Configuration 13, in which an inlet of gas for deploying the airbag is provided in the first deploying portion.

This configuration has the inlet of gas and the second deploying portion provided in the first deploying portion, allowing the gas inlet and the second deploying portion to be close to each other. This allows the gas to efficiently flow to the second deploying portion, allowing the second deploying portion to be deployed quickly.

Configuration 15

The saddled vehicle according to any of Configurations 1 to 14, in which the upwardly deploying portion includes a one-side upwardly deploying portion that extends upward on one side in a left-right direction, an other-side upwardly deploying portion that extends upward on another side in the left-right direction, and a partition portion that partitions a space in the upwardly deploying portion into the one-side upwardly deploying portion and the other-side upwardly deploying portion, the partition portion is provided at least on a rear surface of the upwardly deploying portion, the upwardly deploying portion is bendable from the partition portion extending in an up-down direction, and a connecting member is attached to the rear surface of the upwardly deploying portion to connect the one-side upwardly deploying portion and the other-side upwardly deploying portion in the left-right direction.

This configuration allows the upwardly deploying portion to be bent from the partition portion where the one-side upwardly deploying portion and the other-side upwardly deploying portion each extend in the up-down direction, allowing the upwardly deploying portion to be placed along the rider to properly protect the rider with the airbag. Additionally, this configuration allows the connecting member to restrict the bending state of the one-side upwardly deploying portion and the other-side upwardly deploying portion, allowing the upwardly deploying portion to be effectively placed along the rider.

Configuration 16

The saddled vehicle according to any of Configurations 1 to 15, in which an inflator that jets gas into the airbag to deploy the airbag is connected to the airbag, and a separating mechanism is provided that separates the airbag from the inflator after the airbag is deployed.

This configuration causes the airbag to be separated from the inflator after the airbag is deployed, preventing the airbag from being shifted downward by the inflator after the airbag is deployed. Therefore, the airbag can be properly in close contact with the rider. Furthermore, the airbag can be separated while the airbag grasps the rider.

Configuration 17

The saddled vehicle according to any of Configurations 1 to 16, in which the airbag includes an intermediate portion between the upwardly deploying portion and the second deploying portion, the intermediate portion connects the upwardly deploying portion and the second deploying portion, and the intermediate portion has a smaller inflation amount than the second deploying portion, or is not inflated by gas for deploying the airbag.

This configuration causes the intermediate portion to be in contact with the rider, allowing the airbag to be located at an appropriate height relative to the rider in inflation to properly protect the rider. Adjusting the size of the intermediate portion allows for easily forming airbags with different specifications. The intermediate portion has a small inflation amount or no inflation, allowing the airbag to be deployed quickly.

Configuration 18

A vehicle including an airbag provided in front of a riding position for a rider, in which the vehicle is a stand-up vehicle on which a rider stands at the riding position, the airbag includes a first deploying portion that is deployed upward when deployed, an upwardly deploying portion that is deployed upward from the first deploying portion when deployed, and a second deploying portion that branches and extends from the first deploying portion when deployed, and the second deploying portion extends outward in a vehicle width direction, rearward, or rearward and outward in the vehicle width direction, from the first deploying portion.

This configuration causes the upwardly deploying portion to extend upward from the first deploying portion and causes the second deploying portion to extend outward in the vehicle width direction, rearward, or rearward and outward in the vehicle width direction, from the first deploying portion, allowing the airbag to be compact and allowing the airbag to be prevented from being obstructed by the arms of the rider to properly protect the rider.

Configuration 19

A rider protector including rider equipment, worn by a rider riding on a vehicle, and an airbag, in which the airbag is supported by the rider equipment and is located on a front surface side of a torso of the rider, the airbag includes a first deploying portion that is deployed upward when deployed, an upwardly deploying portion that is deployed upward from the first deploying portion when deployed, and a second deploying portion that branches and extends from the first deploying portion when deployed, and the second deploying portion extends outward in a vehicle width direction, rearward, or rearward and outward in the vehicle width direction, from the first deploying portion.

This configuration causes the upwardly deploying portion to extend upward from the first deploying portion and causes the second deploying portion to extend outward in the vehicle width direction, rearward, or rearward and outward in the vehicle width direction, from the first deploying portion, allowing the airbag to be compact and allowing the airbag to be prevented from being obstructed by the arms of the rider to properly protect the rider.

REFERENCE SIGNS LIST 10,310 saddled vehicle (vehicle)
17,317 seat
21,323,417 handle
35,635 first deploying portion
41 inflator
42,242,542,642 airbag
43,643 upwardly deploying portion
43a rear surface
43c upper surface
44 inflator connecting portion (inlet)
45 one-side upwardly deploying portion
46 other-side upwardly deploying portion
47 partition portion
48 connecting member
49 separating mechanism
50, 250, 650, 650' second deploying portion
51 laterally extending portion
52 rearwardly extending portion
53,653 inner bending portion
54,654 downwardly extending portion
55,655 folded-back portion
252 extending portion
253 second upwardly extending portion
410 vehicle (stand-up vehicle)
418 riding position
560 intermediate portion
652, 652' second rearwardly extending portion
770,870 rider protector
771,871 rider equipment
L1 length (length in deploying direction of the second deploying portion)
L2 length (length, in the deploying direction, which is the sum of lengths of the first deploying portion and the upwardly deploying portion)
R1 arm
R2 leg
R3 torso

The invention claimed is:

1. A saddled vehicle comprising:
a seat for a rider; and
an airbag provided in front of the seat or in a front part of the seat, wherein
the airbag includes a first deploying portion that is deployed upward when deployed, an upwardly deploying portion that is deployed upward from the first deploying portion when deployed, and a second deploying portion that branches and extends from a lower part of a deploying portion formed by the first deploying portion and the upwardly deploying portion when deployed,
the upwardly deploying portion is deployed substantially vertically upward along a front surface of a torso of the rider sitting on the seat and grasping a handle for steering, and
the second deploying portion extends forward and upward, upward, or rearward and upward, in a vehicle side view, from an outer side portion in a vehicle width direction of the first deploying portion, and covers the torso of the rider from an outer lateral side, the first deploying portion being deployed substantially vertically upward,
when deployed, the second deploying portion passes below an arm of the rider and turns to a rear surface side of the rider.

2. The saddled vehicle according to claim 1, wherein the second deploying portion includes a laterally extending portion that extends outward in the vehicle width direction from a lateral side portion of the first deploying portion, and a rearwardly extending portion that extends rearward from the laterally extending portion.

3. The saddled vehicle according to claim 1, wherein the second deploying portion includes a second rearwardly extending portion that extends rearward or posterolaterally from a rear surface of the outer side portion of the first deploying portion.

4. The saddled vehicle according to claim 1, wherein, with the airbag deployed, a length of the second deploying portion in a deploying direction is longer than a length that is a sum of lengths of the first deploying portion and the upwardly deploying portion in a deploying direction.

5. The saddled vehicle according to claim 1, wherein the second deploying portion includes an extending portion that extends outward in the vehicle width direction, rearward, or posterolaterally in the vehicle width direction, from a lateral side portion of the first deploying portion, and a second upwardly extending portion that extends upward from the extending portion to at least a position of the upwardly deploying portion.

6. The saddled vehicle according to claim 5, wherein the second upwardly extending portion extends higher than an upper surface of the upwardly deploying portion.

7. The saddled vehicle according to claim 6, wherein the second upwardly extending portion covers the torso and the arm of the rider from the outer lateral side.

8. The saddled vehicle according to claim 1, wherein the second deploying portion extends between the arm of the rider and a leg of the rider, the rider sitting on the sear and grasping the handle for steering.

9. The saddled vehicle according to claim 1, wherein the second deploying portion extends from the first deploying portion, and has a rod shape that is thinner than the upwardly deploying portion.

10. The saddled vehicle according to claim 9, wherein an inlet of gas for deploying the airbag is provided in the first deploying portion.

11. The saddled vehicle according to 1, wherein
the upwardly deploying portion includes a one-side upwardly deploying portion that extends upward on one side in a left-right direction, an other-side upwardly deploying portion that extends upward on another side in the left-right direction, and a partition portion that partitions a space in the upwardly deploying portion into the one-side upwardly deploying portion and the other-side upwardly deploying portion,
the partition portion is provided at least on a rear surface of the upwardly deploying portion,
the upwardly deploying portion is bendable from the partition portion extending in an up-down direction, and
a connecting member is attached to the rear surface of the upwardly deploying portion to connect the one-side upwardly deploying portion and the other-side upwardly deploying portion in the left-right direction.

12. The saddled vehicle according to claim 1, wherein
an inflator that jets gas into the airbag to deploy the airbag is connected to the airbag, and
a separating mechanism is provided that separates the airbag from the inflator after the airbag is deployed.

13. The saddled vehicle according to claim 1, wherein
the airbag includes an intermediate portion between the upwardly deploying portion and the second deploying portion,
the intermediate portion connects the upwardly deploying portion and the second deploying portion, and
the intermediate portion has a smaller inflation amount than the second deploying portion, or is not inflated by gas for deploying the airbag.

14. A vehicle comprising an airbag provided in front of a riding position for a rider, wherein
the vehicle is a stand-up vehicle on which a rider stands at the riding position,
the airbag includes a first deploying portion that is deployed upward when deployed, an upwardly deploying portion that is deployed upward from the first deploying portion when deployed, and a second deploying portion that branches and extends from the first deploying portion when deployed, and
the second deploying portion extends outward in a vehicle width direction, rearward, or rearward and outward in the vehicle width direction, from the first deploying portion,
when deployed, the second deploying portion passes below an arm of the rider grasping a handle for steering and turns to a rear surface side of the torso of the rider.

15. A rider protector comprising rider equipment, worn by a rider riding on a vehicle, and an airbag, wherein
the airbag is supported by the rider equipment and is located on a front surface side of a torso of the rider,
the airbag includes a first deploying portion that is deployed upward when deployed, an upwardly deploying portion that is deployed upward from the first deploying portion when deployed, and a second deploying portion that branches and extends from the first deploying portion when deployed, and
the second deploying portion extends outward in a vehicle width direction, rearward, or rearward and outward in the vehicle width direction, from the first deploying portion,
when deployed, the second deploying portion passes below an arm of the rider grasping a handle for steering and turns to a rear surface side of the torso of the rider.

16. The saddled vehicle according to claim 1, wherein
the second deploying portion includes:
a laterally extending portion that extends outward in the vehicle width direction from both lateral side portions of the first deploying portion, and a rearwardly extending portion that extends rearward from the laterally extending portion; and
a second rearwardly extending portion that extends rearward or posterolaterally from a rear surface of the outer side portion of the first deploying portion.

17. The saddled vehicle according to claim 16, wherein
the second deploying portion includes an inner bending portion that bends inward in the vehicle width direction from at least any one of the rearwardly extending portion and the second rearwardly extending portion, and
at least part of the inner bending portion overlaps the upwardly deploying portion in a vehicle front-rear direction.

18. The saddled vehicle according to claim 17, wherein each of the rearwardly extending portion and the second rearwardly extending portion extends to be progressively located toward an outer side in the vehicle width direction as the rearwardly extending portion and the second rearwardly extending portion extend rearward until reaching the inner bending portion.

19. The saddled vehicle according to claim 17, wherein the second deploying portion includes a downwardly extending portion that bends from the inner bending portion and extends downward.

20. The saddled vehicle according to claim 19, wherein the second deploying portion includes a folded-back portion that is folded back from the downwardly extending portion toward the rearwardly extending portion or the second rearwardly extending portion.

\* \* \* \* \*